United States Patent
Gong et al.

(10) Patent No.: US 10,282,616 B2
(45) Date of Patent: May 7, 2019

(54) VISUAL DATA MINING

(71) Applicant: Vision Semantics Limited, London (GB)

(72) Inventors: Shaogang Sean Gong, Middlesex (GB); Timothy Miguel Hospedales, London (GB)

(73) Assignee: Vision Semantics Limited, London (GB)

( * ) Notice: Subject to any disclaimer, the term of this patent is extended or adjusted under 35 U.S.C. 154(b) by 309 days.

(21) Appl. No.: 15/028,082

(22) PCT Filed: Oct. 17, 2014

(86) PCT No.: PCT/GB2014/053116
§ 371 (c)(1),
(2) Date: Jul. 12, 2016

(87) PCT Pub. No.: WO2015/056024
PCT Pub. Date: Apr. 23, 2015

(65) Prior Publication Data
US 2016/0239711 A1  Aug. 18, 2016

(30) Foreign Application Priority Data
Oct. 18, 2013  (GB) .................................. 1318472.6

(51) Int. Cl.
G06K 9/00 (2006.01)
G06F 17/30 (2006.01)
G06K 9/66 (2006.01)

(52) U.S. Cl.
CPC ... *G06K 9/00718* (2013.01); *G06F 17/30256* (2013.01); *G06F 17/30828* (2013.01);
(Continued)

(58) Field of Classification Search
None
See application file for complete search history.

(56) References Cited

U.S. PATENT DOCUMENTS 8,102,406 B2   1/2012  Peleg et al.
2003/0195883 A1  10/2003 Mojsilovic et al.
(Continued)

FOREIGN PATENT DOCUMENTS

GB  2493580 A  2/2013

OTHER PUBLICATIONS

Zhang, Lijun et al., "Context-Dependent Fusion of Multiple Algorithms with Minimum Classification Error Learning," Machine Learning and Applications, ICMLA 2009, pp. 190-195.
(Continued)

*Primary Examiner* — Matthew C Bella
*Assistant Examiner* — Brian D Shin
(74) *Attorney, Agent, or Firm* — Banner & Witcoff, Ltd.

(57) ABSTRACT

Method and system for finding targets within visual data, comprising receiving target object information. Generating a set of target object semantic attributes from the target object information. Identifying a plurality of candidate objects within visual data. Generating a set of low-level feature descriptors from the visual data for each candidate object. Generating from the set of low-level feature descriptors a set of candidate semantic attributes for each candidate object within the visual data. Identifying one or more portions of the visual data containing a candidate object, from the plurality of candidate objects, having a set of candidate object semantic attributes that match the set of target object semantic attributes. Providing an output indicating the identified one or more portions of the visual data.

18 Claims, 3 Drawing Sheets

(52) U.S. Cl.
CPC ..... *G06K 9/00295* (2013.01); *G06K 9/00751* (2013.01); *G06K 9/00758* (2013.01); *G06K 9/66* (2013.01)

(56) References Cited

U.S. PATENT DOCUMENTS

| | | |
|---|---|---|
| 2007/0073749 A1 | 3/2007 | Fan |
| 2011/0225136 A1 | 9/2011 | Tu et al. |
| 2012/0026335 A1 | 2/2012 | Brown et al. |
| 2012/0027304 A1 | 2/2012 | Brown et al. |
| 2012/0030208 A1 | 2/2012 | Brown et al. |
| 2012/0039506 A1 | 2/2012 | Sturzel et al. |
| 2014/0247992 A1 | 9/2014 | Lin et al. |

OTHER PUBLICATIONS

Jul. 20, 2017—Examination Report—EP Application No. 14787045.5.
Feb. 2, 2015—International Search Report and Written Opinion—WO App PCT/GB2014/053116.
Apr. 17, 2014—GB Search Report—GB App 1318472.6.
Oct. 7, 2010—"Towards Person Identification and Re-Indentification with Attributes"—Ryan Layne, et al.—Computer Vision ECCV 2012.
2012—"Person Re-indentificaiton by Attributes"—Ryan Layne, et. al—Queen Mary Vision Laboratory.
Dec. 2012—"Attribute-restricted Latent Topic Model for Person Re-Identification"—Xiao Liu, et al—Pattern Recognition.
2010—"Person Re-Identification by Symmetry-Driven Accumulation of Local Features"—M. Farenzena et al.
2006—"Schematic storyboarding for video visualization and editing"—Goldman et al.
2012—"Discovering important people and objects for egocentric video summarization"—Lee et al.
2008—"Nonchronological Video Synopsis and Indexing"—Pritch et al—IEEE Transactions on Pattern Analysis and Machine Intelligence.
2012—"Online content-aware video condensation"—Feng et al.
2010—"Person Re-Identification by Support Vector Ranking"—Prosser et al.
2011—"Articulated pose estimation with flexible mixtures-of-parts"—Yang et al.
2013—"Cross-Domain Traffic Scene Understanding by Motion Model Transfer"—Xu et al.—Artemis Workshop at ACM Multimedia.
2012—"Street-to-shop: Cross-scenario clothing retrieval via parts alignment and auxiliary set"—Liu et al.
2013—"Attributes-Based Re-Identification"—Layne, et al—Person Re-Identification.
2010—"Object detection with discriminatively trained part based models"—Felzenszwalb et al.
2010—"Learning Human Pose in Crowd"—Gong et al—ACM MM Workshop on Multimodal Pervasive Video Analysis.

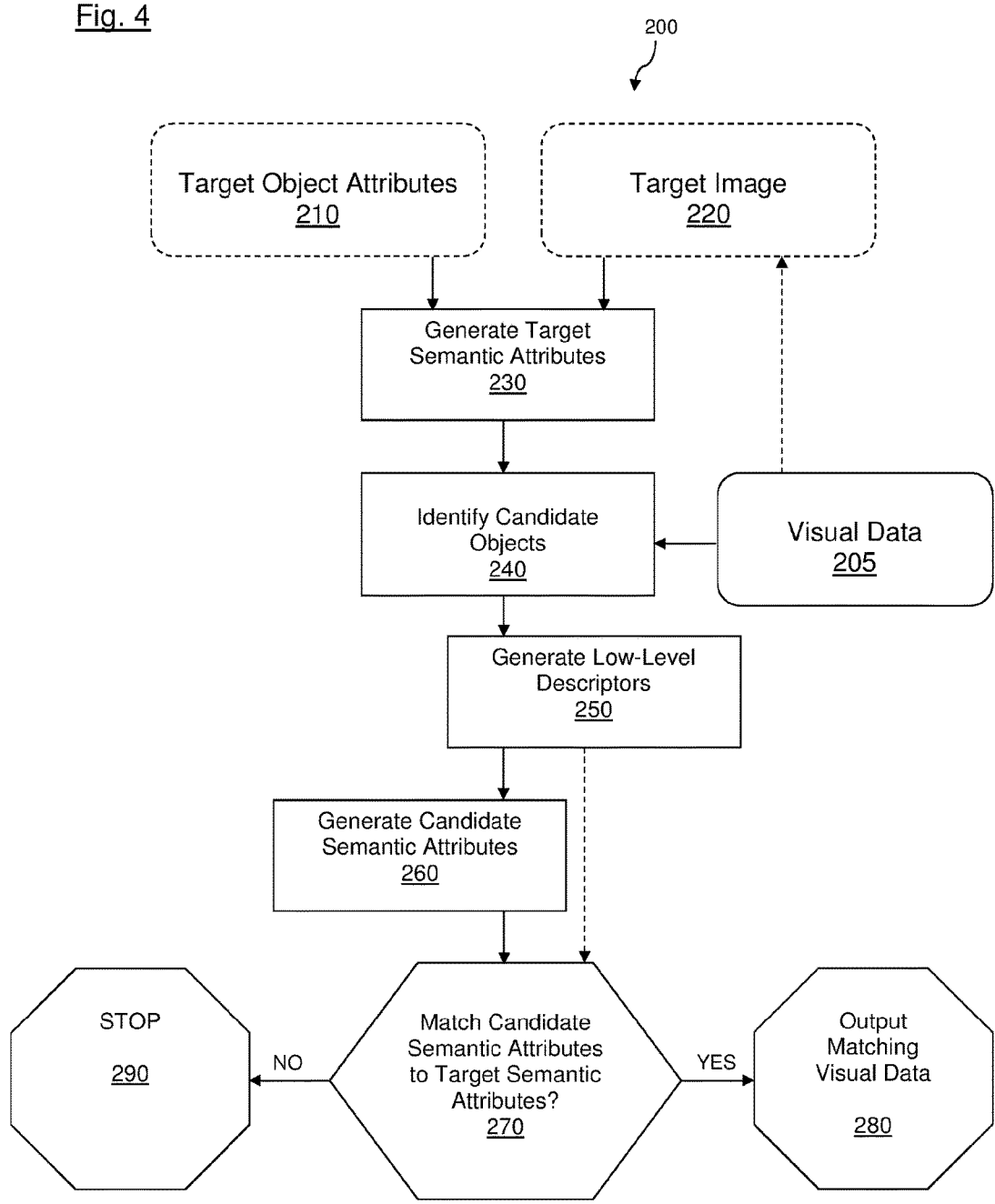

VISUAL DATA MINING

CROSS-REFERENCE TO RELATED APPLICATIONS

This application is a U.S. National Stage application under 35 U.S.C. § 371 of International Application PCT/GB2014/053116 (published as WO 2015/056024 A1), filed Oct. 17, 2014, which claims priority to Application GB 1318472.6, filed Oct. 18, 2013. Benefit of the filing date of each of these prior applications is hereby claimed.

FIELD OF THE INVENTION

The present invention relates to a method and system for identifying targets within visual data and in particular, locating targets within video sources. The identification may be used to summarise the visual data or for other purposes.

BACKGROUND OF THE INVENTION

Monitoring the world's growing volume of surveillance video is becoming prohibitively costly and increasingly error prone. Millions of surveillance and web cameras around the world are generating video and other visual data faster than it can be manually assessed. For this reason target identification and video summarization technologies are of growing importance. These systems produce summarized videos in various ways, generally with the aim of automatically presenting the interesting, salient or important content to the user more quickly than this content could be found by watching all the video linearly.

Current video summarization techniques broadly span two categories: key-frame based, which attempt to discover salient key-frames for summarization as a storyboard [1,2], and object track based, which attempt to non-chronologically blend multiple object tracks into a single frame to compress the total length of video [3,4,5]. Prior summarization systems [1,2,3,4,5], have two key limitations: (i) They typically summarize based on low-level signal features such as foreground motion, object detections, and bounding box geometry. However due to the semantic gap in video data, low-level signal (imagery) feature statistics do not necessarily correspond to salient/relevant content of semantic interest. (ii) Moreover, they typically only summarize within one camera view, whereas most contemporary surveillance systems have many disjoint camera views surveying a wide area of spaces. Critically, it is unclear how to summarize semantically multi-camera (and multi-location) holistic visualisation data in a sensible and coherent way.

As well as summarizing video feeds to reduce the review effort, there is also required a method and system for identifying particular objects (especially people) within large sets of visual data, such as that generated by multiple video cameras. However, current systems and methods require improvements in such processing, reviewing and filtering techniques.

Therefore, there is required a method and system that overcomes these problems.

SUMMARY OF THE INVENTION

In order to overcome these problems, a visual content or data target visualization, target finding and summarization method and system are provided. This system and method provides various semantically meaningful opportunities for summarization by receiving target object information (that may be supplied by a user or from other sources). This target object information may take various forms or be in multiple formats. For example, a user may supply a still image of a target person. Alternatively or additionally, the user may provide a semantic description of the target person or object (e.g. a tall man wearing a red hat). This target object information is then used to either generate automatically from the visual data (e.g. image) or specify by the given description, a set of target object semantic attributes. Improved results may be achieved by using both an image of the target object (e.g. person) and semantic attributes describing the target object. These two sources of information may be combined to produce a more complete representation of the target object to be used for example, for a target re-identification and/or video content summarisation purposes.

The target object semantic attributes may then be used to match against potential or candidate objects within an amount of visual data (e.g. one or more video feeds). The target object semantic attributes may take various forms. Furthermore, several stages may be executed in the generation of the target object semantic attributes and these stages may be dependent on the amount, type and quality of the target object information provided.

The format of the target object semantic attributes may be textual, for example. In order to search for matching candidate objects based on semantic attributes in a textual form, a binary string may be formed, where each bit of the string may be derived from a textual word (for example), those candidate objects may be processed in order to generate semantic attributes associated to each candidate object.

This may be achieved in several ways. For example, low-level features of the images of candidate objects may be extracted. These may be image features such as color, luminance, texture (each typically (but not necessarily) encoded as histograms) other information about objects including, bounding box geometry, object detections (presence), foreground motion, or other features that may be directly extracted from the pixel information of an image or portion of an image (still or moving).

The attributes may have only one internal representation (numeric). However, they may be presented to the user in terms of corresponding text for easier understanding. For example, text descriptions like "Man with a t-shirt and jeans" may correspond to a representation of [1, 1, 1, 0, 0] if the three dimensions of internal representation correspond to male/female, t-shirt/no t-shirt, suit/no suit, tie/no-tie.

Similarly, if a user supplied a still image of a person they wished to find in a video stream or store, then semantic attributes may be generated from that still image.

Generating semantic attributes for images (i.e. of a user supplied image or of candidate targets) may be achieved by taking the image (or only the portion of the image that displays the object) and extracting from it low-level features (e.g. colour, luminance or histogram). These low-level features may be compared with low-level features extracted from images having known semantic attributes (e.g. by user input or preferably from machine learning techniques).

Where the low-level features match or are within a defined tolerance, then the system may allocate the same semantic attributes to the object image as the previously defined images. In this way, the system can process all candidate objects identified in the video source.

However, it may not be possible in practice to get a training target object with exactly the same combination of attributes as you see in testing. In one example, the support vector machine (SVM) method is used to learn what features matter, and how similar they should be to a model that is built. In this example method, a matching model may be constructed from training images.

A target may rarely (or never) appear with exactly the same combination of attributes at different locations and time. The SVM method may be used to learn what features matter (with some limited/incomplete samples as training data) when such variation in target appearance may occur and when the system does not know how that variation may be caused—this part helps make the model more than the samples it used to train itself. This may be referred to as building/learning a model. The model may then be used to find a match for instances of the likely target in other visual data (e.g. video) unseen before. The matching may be based on how similar the new/unseen data should be to the model (this similarity metric may be part of the model). Therefore, the matching may be with a model (that may be constructed from some partial samples), but not to the training images themselves, as the training samples themselves are typically incomplete/noisy and may not give a good representation of the target (i.e. training samples themselves do not generalise, but the model should).

Where semantic attributes of the target object match semantic attributes of candidate objects then the portions of the video source that contains matching candidate objects are provided as an output or perhaps otherwise marked and recorded.

Where the target object information contains semantic attributes (perhaps provided by the user) or even where this is the only target object information provided, then the candidate object search is carried out on these semantic attributes. Some semantic attributes may be more reliable at providing results or matches and the matching process may include assigning various weights to each attribute to take this into account (i.e. more reliable semantic attributes may have a greater weighting).

Semantic attributes may be used to perform re-identification for video summarisation. Semantic attribute re-identification, can be implemented by using a set of humanly nameable mid-level constituent properties that can be used to describe an instance or a category of people/persons. This is differentiated from low-level imagery properties such as pixels characteristics (individual or collective) or color histograms, because these are not human describable therefore not semantic. Attributes may also be differentiated from the naming of image categories or object identities because a category/identity is a single label for an image, rather than a description by constituent parts. Semantic attributes need to be able to describe a category or identity.

This is important, because using semantic properties allows a video data summarization system to be built in a unique way that is (1) more useful to the human operator (versus for entirely machine automated process) who can express human user queries to the system in human terms, and (2) a highly robust and selectively discriminative learning mechanism due to significantly lower dimensional representation.

Preferably, the user can provide both an image of the target (or identify the target within the video source) and also provide semantic attributes. For example, the user may know that the target is bald but the image shows the target wearing a hat. In this case, a set of target object semantic attributes may be generated from the image (i.e. from low-level features of the image) and the "bald" semantic attribute may be added to the visual data set to be searched.

In some embodiments, human input may be used to generate attributes and identity semantics without relying on conventional biometrics, such as faces. The resulting summaries may be both more semantically salient, more customizable for user relevance, and provide a coherent means to "connect" and visualise multi-camera and multi-location video.

There is also provided a method and system for re-identification of targets within visual data. Re-identification involves finding and correlating different visual instances of a target across space or time (e.g. different views from the same or different cameras). In particular, two instances or images (moving or still) of the same target can be dissimilar. They may even be less similar than separate images or instance of different targets. For example, images of two different people (especially when taken within one camera) may have greater similarity than two images of the same person (especially when taken by different cameras). In other words, the intra-class variation may be greater than the inter-class variation; the distribution function may have significant overlap for different objects or targets.

Against this background and in accordance with a first aspect there is provided a method for finding targets within visual data, the method comprising the steps of:
  receiving target object information;
  generating a set of target object semantic attributes from the target object information;
  identifying a plurality of candidate objects within visual data;
  generating a set of low-level feature descriptors from the visual data for each candidate object;
  generating from the set of low-level feature descriptors a set of candidate semantic attributes for each candidate object within the visual data;
  identifying one or more portions of the visual data containing a candidate object, from the plurality of candidate objects, having a set of candidate object semantic attributes that match the set of target object semantic attributes; and
  providing an output indicating the identified one or more portions of the visual data. Therefore, target objects appearing in different parts of visual data may be located and summarized more effectively.

Preferably, the low-level features may be any one or more selected from the group consisting of: luminance, colour, and texture histogram. Other low-level features may be used.

Optionally, the received target object information may include a moving or still image of the target object. This image may be captured from the same camera or from a different camera to the source of the visual data.

Optionally, the step of generating a set of target semantic attributes from the target object information may further comprise:
  generating from the moving or still image of the target object a set of target low-level feature descriptors; and
  generating the target semantic attributes from the target low-level feature descriptors. This provides an automated way to generate the semantic attributes.

Preferably, generating semantic attributes from the generated low-level feature descriptors may comprise:
  identifying semantic attributes within a database associated with stored low-level feature descriptors that match the generated low-level feature descriptors. In other words, a database of semantic attributes and associated low-level feature descriptors may be maintained. Low-level feature descriptors from an image of a target or candidate object (e.g. person) may be compared with those in the database. Where there are matches then the stored semantic attributes or set of semantic attributes can be retrieved and used. A more complete description of this is provided in Annex A.

Optionally, the identified semantic attributes within the database may be generated from still and/or moving images of objects previously assigned with semantic attributes or developed using machine learning techniques. A more complete description of this is provided in Annex A.

Optionally, the database may be built by:
searching for moving or still images associated with the one or more semantic attributes;
extracting low-level feature descriptors from the moving or still images; and
storing in the database the one or more semantic attributes associated with the extracted low-level feature descriptors.

Preferably, the moving or still images may be located on the internet or other source.

Optionally, the received target object information may include one or more semantic attributes.

Optionally, the semantic attributes may be received from a user. This may be by using free text entry or by selecting one or more semantic attributes from a selection (i.e. a binary selection).

Optionally, the semantic attributes may be any one or more selected from the group consisting of: shirt colour, trouser type, bare legs, coat, male, female, dark hair, hair colour, bald, carrying bag, bad type, skirt, hat, child, adult, and facial hair. Many other semantic attributes may be used. This can be more useful to a human operator (versus for entirely machine automated process) who can express human user queries to the system in human terms.

Optionally, the step of identifying one or more portions of the visual data containing a candidate object, from the plurality of candidate objects, having a set of candidate object semantic attributes that match the set of target object semantic attributes may further comprise the step of:
finding matches between the set of candidate object semantic attributes together with low-level features (LLF) and target object semantic attributes (i.e. the second term in the following equation) and LLF (first term) by finding the most similar match according to:

$$d(x_i,x_j)=w_{LLF}d_{LLF}(x_i,x_j)+w_A(A(x_i)-A(x_j))^T M(A(x_i)-A(x_j))$$
Equation 1 where i and j index target and candidate images respectively, $w_{LLF}$ and $w_A$ weight the contributions of low-level features and semantic attributes, respectively, A(x) is the attribute profile vector of the image x and M is a diagonal or full Mahalanobis matrix to encode weights for individual semantic attributes and semantic attribute correlations, respectively. This provide a more robust and selectively discriminative learning mechanism due to significantly lower dimensional representation.

Preferably, the step of identifying one or more portions of the visual data containing a candidate object, from the plurality of candidate objects, having a set of candidate object semantic attributes that match the set of target object semantic attributes may further comprise the step of:
finding matches between the set of candidate object semantic attributes and target object semantic attributes by finding the most similar match according to:

$$j=\operatorname{argmin} d(x_i,x_j)$$

where $d(x_i,x_j)$ is the distance between the appearance of the visual data containing the candidate object and visual data containing the target object.

Optionally, the set of target object semantic attributes may be weighted according to a machine learning model.

Preferably, the machine learning model may be distance metric learning, support vector machine (SVM), or RankSVM.

Optionally, the method may further comprise the step of restricting the visual data to image areas of the visual data containing candidate objects.

Preferably, the output provides a summary of the visual data. The output may be in other forms included those that do and don't include a visual display.

Optionally, the visual data may be any one or more of video, short clips, stills, from the same camera, from a different camera. The visual data may be live or recorded, for example.

Optionally, the visual data may be obtained from one camera at different times or a plurality of cameras at different locations.

Optionally, the target object information is a user or operator selection of a target within a moving image.

According to a second aspect, there is provided a system or computer system for identifying targets within visual data, comprising:
an output device; and
a processor or computer logic configured to:
receive target object information;
generate a set of target object semantic attributes from the target object information;
identify a plurality of candidate objects within visual data;
generate a set of low-level feature descriptors from the visual data for each candidate object;
generate from the set of low-level feature descriptors a set of candidate semantic attributes for each candidate object within the visual data;
identify one or more portions of the visual data containing a candidate object, from the plurality of candidate objects, having a set of candidate object semantic attributes that match the set of target object semantic attributes; and
send to the output device an output indicating the identified one or more portions of the visual data. Optionally, the match may also be based on LLFs together with semantic attributes.

Preferably, the system may further comprise one or more video feeds configured to provide the visual data (either live or stored) to the processor.

According to a third aspect, there is provided a method or system for re-identifying one or more targets within visual data, the method comprising the steps of:
receiving target object information;
generating a set of target object semantic attributes from the target object information;
identifying a plurality of candidate objects within visual data;
generating a set of low-level feature descriptors from the visual data for each candidate object;
generating from the set of low-level feature descriptors a set of candidate semantic attributes for each candidate object within the visual data; and
identifying one or more candidate objects, from the plurality of candidate objects, having a set of candidate object semantic attributes that match the set of target object semantic attributes.

Optionally, the method may further comprising the step of providing a summary of the visual data by outputting portions of the visual data containing the identified one or more candidate objects.

According to a fourth aspect there is provided a method or system for summarising visual data comprising the steps of:

receiving target object information;

generating a set of target object semantic attributes from the target object information;

identifying a plurality of candidate objects within visual data;

generating a set of low-level feature descriptors from the visual data for each candidate object;

generating from the set of low-level feature descriptors a set of candidate semantic attributes for each candidate object within the visual data;

identifying one or more portions of the visual data containing a candidate object, from the plurality of candidate objects, having a set of candidate object semantic attributes that match the set of target object semantic attributes; and outputting the identified one or more portions of the visual data. For example, the output may be in the form of a collage of visual data on a screen or stored as a reduced data set for later retrieval.

The methods described above may be implemented as a computer program comprising program instructions to operate a computer. The computer program may be stored on a computer-readable medium.

The system may be a computer system that includes a processor such as a central processing unit (CPU). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operation system such as UNIX, Windows® or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which:

FIG. 4 shows a flowchart of the method of FIG. 1.

It should be noted that the figures are illustrated for simplicity and are not necessarily drawn to scale. Like features are provided with the same reference numerals.

DETAILED DESCRIPTION OF THE PREFERRED EMBODIMENTS

Early methods consider visual semantic attributes for person search [6] and attributes for multi-camera tracking [7]. However, these do not address a number of crucial technical issues required for any practical engineering system solution. Various embodiments facilitate:

(1) how to generate and validate an attribute ontology that is supported by signals (i.e. measurable from data), (2) how to correlate attributes with low-level signal features to facilitate tractable re-identification (attributes alone may be insufficient and a combined semantic-attribute with signal features by an appropriate fusion mechanism provides improved results—see Annex A and equation 1), (3) how to design a mechanism for machine learning and exploiting attribute profiles, and (4) how to fully exploit attributes, re-identification and their synergy for multi-camera semantic video summarization.

There has been extensive work on person re-identification [9], but this does not generally consider high-level attribute semantics or their exploitation for video screening and summarization. Extensive work on facial-image based identification has been conducted [8]. However this generally requires frontal images captured in high-resolution controlled conditions rather than the uncontrolled images of arbitrary pose and low-resolution of the entire person appearance with unknown view angle, distance/size, and self-occlusion, which are relevant to the most realistic surveillance scenarios.

Figure 1:
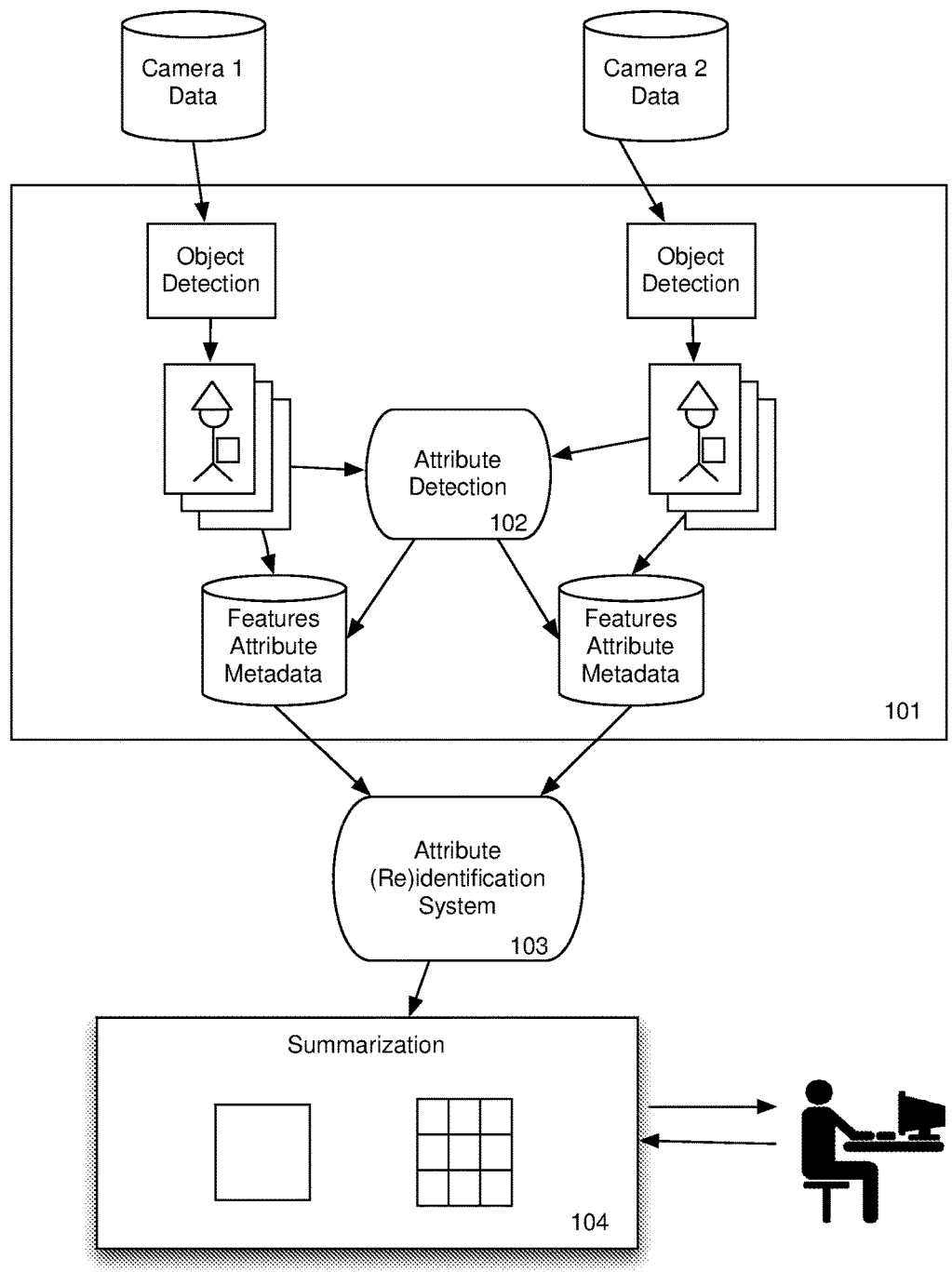
FIG. 1 shows a schematic diagram of a system and method for finding targets within visual data, such as video images.

In each summarization feature, the system may display the summarized visual data (video) from multiple cameras either as a single stream by interleaving or appending segments, or as a grid collage of streams according to the user's selectable preference (see FIG. 1, 104). The semantic summarization allows segments to be chosen and included in the single stream (thus shortening it), or in the grid of streams (thus both potentially shortening the maximum length of the grid of streams, and reducing the number of streams in the grid allowing the others to be re-arranged and magnified to take up the remaining space).

Preprocessing Module

Incoming video streams from multiple cameras are preprocessed to extract basic semantic information (FIG. 1, 101). First, persons or objects are detected in all streams using any suitable object detector [14, 15] and within-camera tracker. Subsequent computation may be restricted to these detected bounding-boxes for efficiency. Preferably, a human body-model [10] may be fit to the detection to ensure that low-level features (LLFs) are extracted from corresponding human body-parts, and not background clutter. An array of LLFs is extracted for each detection, including for example, color and texture histograms [9]. Next, detectors for an array of semantic attributes are applied to each detected person or object (FIG. 1, 102). Attributes may include, by way of example rather than limitation: gender, hat wearing, glasses wearing, tall/short, red shirt, blue jeans, etc. Preferably the attributes are detected in a manner that exploits knowledge of their correlation for improved extraction accuracy compared to independent detection, for example by way of a latent support vector machine classifier. If the features are extracted in spatial strips [9] or from detected human body-parts [10], then preferably support vector machine (SVM) multi-kernel learning should be used to select and weight the spatial regions. This can also be used to select and weight between different feature types such as color and texture, each of which will be appropriate for different attributes. The result is that each detection is now associated with both a LLF descriptor x, and an attribute profile vector $A(x)=[p_1(x), \ldots, p_N(x)]$ specifying the probability $p_a(x)$ that each attribute a in the system's ontology is present for this person.

Summarization Feature 1: Person(s) of Interest

A typical usage scenario for semantic video-summarization is the operator wishes to see all the activities of a particular person of interest. To provide this feature, the system accepts either: a user nominated person (target object) detection from the pre-processed visual data (video) stream (see preprocessing module), a prior watch-list image of a person, and/or a textual description of the person in terms of their known attributes (e.g. semantic attributes).

If an image (either moving or still) is used as input, the attribute detector may be applied to the image. If a textual attribute description is used as input, the visual data is searched for target object or person detections that meet the description of the specified semantic attributes and possible or candidate matches are presented to the user preferably sorted according to the probability of match. The user may preferably select at least one true-match. In each case, both an image/LLF description and an attribute-level description may now be stored for the target object (person of interest). Alternatively, no user input is required and the system uses one of the matches (usually the best or most appropriate match).

Re-identification (see re-identification module) may now be used for long-term association of the person of interest across all cameras, spatial locations, and times.

A single coherent person centric summary visualization/filtering of the visual data (video) collected from distributed locations may be generated and centered on showing the targeted person(s) as they move around the camera network appearing in different locations or at different times on the same camera.

The output or synthesized video then may be generated in a variety of ways which the user may select: (i) The full sequence of the target's movements within and across-views at distributed locations; (ii) Representative examples of their movement in each view; (iii) Just the transitions at which they leave one-view and enter another; (iv) The most unusual movements they have made compared to typical demographics (see Statistical Summaries); (v) As a static summary of their travel profile (e.g., as projected birds-eye view onto a map). Other presentation schemes may be used. The output may also be in a form that isn't displayed to the operator. For example, portions of the visual data containing matches of candidate objects with target objects may be marked, tagged, stored or otherwise associated with the match.

Summarization Feature 2: Interactive Description Based Summarization

In a second usage scenario or embodiment, the operator does not have a prior image or unique description of a target object (person of interest), but may know a partial or full description of a particular person or target object (e.g. vehicle), or the attributes of a category of person of interest.

This process may be performed by specifying and running an attribute query, or starting the summary display and interactively or iteratively filtering the playback. In the interactive case, the multi-camera summarization system starts out showing a collage of all the video streams, each preferably playing synchronized in time. The operator may interactively edit which cameras are to be searched (all, or some subset of the cameras) and may interactively edit a list of attributes by which to filter the summarization (e.g., persons with a briefcase). The streams are filtered so only segments meeting the specified attribute-filter are shown (i.e., those segments in each view showing a person with a briefcase). The collage may show a non-synchronized, non-linear collage of videos as a result. As an increasingly specific list of attributes is given, the length of video matching the constraints within each view is decreased and the length of the whole collage is shortened. Multiple attributes may be specified conjunctively or disjunctively with operators AND and OR. When some cameras do not match the attribute-filter at all, their view may be dropped and the overall collage dynamically magnified. The system may provide a user-customizable confidence threshold, so that the summarization video shows clips where the specified attributes are present with confidence greater than the threshold. This trades off the strength of the summarization with the false-negative rate, where attribute occurrences missed from the summarization.

The summarized video may be generated in a variety of user-selectable ways according to the strength of the summarization required. For example: (i) the full sequence of everyone meeting the specified constraints, (ii) a globally representative sample of people meeting the constraints (shown in order of attribute detection confidence over all views), and (iii) a representative sample of target objects or people in each view meeting the constraints (shown in order of attribute detection confidence within each view).

Summarization Feature 3: Combinations of Re-Identification and Attributes

The operator can indicate a combination of person identities, or person identities and attributes to generate summary videos by filtering according to these constraints.

Selecting two or more particular target objects or persons (see Feature 1), the summary video is then generated by showing all those segments where those people appear together in the same segment.

People or target objects can change attributes over time, e.g., pick up/put down an object. Selecting a person and an intrinsic attribute, the summary video is then generated by showing all those segments where the specified person appears with that attribute (e.g., specified person appears with a briefcase).

The operator can indicate a particular change of attributes of interest. The summary video can then be generated showing all those segments where a specified person or arbitrary person made the specified attribute change. (E.g., show clips where any person went from holding to not holding a briefcase, or the clips where this specified person took off their hat); or all those pairs of segments where the same person appears with the specified attribute change across these segments (e.g., show pairs of clips where the same person had a briefcase in one clip, and no briefcase in the second clip). Alternatively, the operator can indicate that any chance or probability of an attribute or semantic attribute is of interest, in which case the summarization can include every change of attribute.

Selecting a person and an extrinsic attribute, the summary video is then generated showing all those segments where the person appears together with any other person (or another target object) with the specified attribute (e.g., clips where the specified person appears near another person with shades and a briefcase).

Finally, the filtering can also be specified by a conjunction of cameras or visual data sources. (For example, "show all persons with shades who appeared in both the office and the garage camera"). In this case re-identification is performed on the entire population of person-detections in order to perform long-term association, and those people meeting the specified criteria are shown or provided as an output.

Summarization Feature 4: Statistical Semantic Summarization

A final usage scenario is the user requires an overview of the typical persons/objects in the space. This is often performed by showing typical classes of objects, or perhaps typical low level features such as sizes as determined by a bounding box.

In the present example embodiment, this capability may be offered at a semantic level. The attribute profiles A(x) of all the persons in the collection of videos are clustered (e.g., by Mixture of Gaussians). The clustering may be performed both within each camera view and globally. This results in identification of the typical semantic groups people in the surveilled space, e.g., as represented by the Gaussian mixture model (GMM) means and covariances. For example, a cluster may group people with black pants, jackets, white shirts and ties—suited people.

The long-term inter-camera trajectories of all persons in the visual data (video) collection may also be clustered: within-camera trajectories, for example with dynamic time warp and spectral clustering or GMMs [11], and across-camera transitions are easily tabulated by frequency. This results in an identification of the typical trajectories and spatio-temporal camera transitions.

With these statistics summary videos or an output indicating portions of the visual data containing matched candidate objects, may be generated both based on attribute and re-identification.

Attribute Statistics: Summaries or outputs based on attribute-statistics: The summary video is generated showing either: an example of each typical category of person across the entire camera network, or an example of each typical category of person within each view (where typicality may vary according to the typical demographics of each individual view). For a GMM model of attribute statistics, the likelihood of each person's attributes under a particular Gaussian k is $p_k(A(x))=N(A(x);\mu_k,\Sigma_k)$ (Equation 2), and overall is:

$$p(A(x)) = \sum_k \pi_k N\left(A(x); \mu_k, \sum_k\right)$$

(Equation 3). Typicality overall, or for a particular cluster, is quantified by sorting examples x by the corresponding likelihood. The summary video may then consist of the most typical examples overall, or of each category of person. And this may be generated globally across all cameras or locally for each camera.

A summarization capability complementary to showing typical persons or objects is to show atypical ones, i.e. those with low-likelihood. Note that a person may have highly or absolutely unlikely attributes, or an unlikely combination of attributes. In the case of GMMs, the latter may be achieved by using a full covariance Gaussian, so that persons or objects with an atypical combination of attributes are also detected. For example, wearing a hoodie and carrying a briefcase may co-occur infrequently. If this occurred it would have a low likelihood under any Gaussian and may be detected as an atypical event. The multi-camera video is then summarized so that segments are played back in order of likelihood or inverse likelihood for typical or atypical summaries. The user may request globally atypical attributes or combinations, or view-specific attributes or combinations.

Re-identification statistics: Similarly to the case for attributes, trajectories may be ranked from the most typical to the most atypical, so that summaries can be generated to focus on the most or least typical according to the user request.

The re-identification and attribute profiling of persons may also be used to generate non-video textual or diagrammatic summaries of the surveilled space.

Re-identification statistics may be used to provide summaries of typical inter-view/zone connections by way of a table or diagram.

Attribute statistics can be used to profile demographic summaries on a per-view or global site basis by tabulating the commonly occurring attributes and attribute profiles. These may be also presented as graphs showing the variation of these statistics over time.

To provide the specified features, attribute detection and re-identification capabilities are required. The following are some specific example mechanisms for each.

Attribute Detection Module and Automatic or Semi-Automatic Generation of Attribute Ontology The attribute ontology defines the space of semantic attributes (e.g., hat, blue jeans), which the system may detect and index. Depending on the application scenario, the user may have a particular domain-specific ontology in mind, or be willing to use a generic ontology. In any case, some attributes may be significantly easier (more accurate) to detect visually than others (e.g., obvious red t-shirt versus visually subtle stud earrings), so an ontology composed of reliably detectable attributes is preferred so that the system makes fewer errors.

For manual ontology generation, the user specifies an initial ontology, and then either: (i) annotates a large set of detections from the intended deployment location with the ground-truth attributes, or (ii) gets images returned from internet sources. In one example, the ontology may be used as keywords for Internet online clothes shopping searches. For each image, the LLF descriptors may then be extracted (e.g., color and texture histograms) from any matches.

For semi-automatic ontology generation, images from online sources such as flickr and clothes shopping sources (for example) may be queried [10]. The text metadata annotations for each of these may be preprocessed by tokenization, spell-checking, stop-word removal. Unigrams and bi-grams are generated, clustered to merge synonyms, and finally those above a minimum threshold of frequency form the initial vocabulary.

The system may use machine-learning methods (e.g., support vector machines) to train detectors for each attribute in the initial ontology. The occurrence statistics of each attribute varies dramatically, so some attributes may occur in highly imbalanced frequencies (e.g., imperial moustache may be rare, black suit may be relatively common). Training a vanilla classifier to detect the attributes may therefore fail or be perform poorly, so the imbalanced data is dealt with, e.g., by down-sampling the majority class, or up-weighting the cost of misclassifying the minority class in the classifier objective function.

Attributes that cannot be detected reliably (below a threshold of cross-validation accuracy) can be discarded. The remaining attributes form the final ontology, and their associated detectors form the attribute detection module (FIG. 1, 102).

Semantic Attribute Enhanced Re-Identification Module

Person re-identification (finding the same target object across time or from different visual data sources) is a major open problem in computer vision, typically addressed by quantifying the similarity of LLFs [9]. It is challenging because variations in pose and lighting mean that appearance is more variant across space and time than across identity. In contrast, attributes have the advantage that a detector trained on data from a variety of viewing conditions learns to generalize about the appearance of that attribute in different views. Attributes can be used synergistically with any conventional LLF approach to achieve higher re-identification accuracy. The similarity of each attribute across a pair of detections in different views provides information about the chance that the detections are the same person.

For example, using support-vector machine multi-kernel learning, one kernel can be defined to represent LLF distance and another can represent attributes in a SVM or RankSVM objective for predicting same versus different pairs of persons. In the following we describe a specific example of LLF-attribute fusion using metric learning and nearest neighbor.

Many conventional re-identification approaches based on nearest neighbor match person i with LLF appearance x, by finding the most similar match j:

$$j = \mathrm{argmin} \, d_{LLF}(x_i, x_j) \qquad \text{Equation 4}$$

where $d_{LLF}(x_i, x_j)$ is some, possibly learned, distance metric between the appearances.

In more general terms, the match may be based on $j = \mathrm{argmin}(x_i, x_j)$.

To combine attributes and LLFs, in the present embodiments the overall distance between two persons or target objects may be taken as the weighted sum between the low-level and attribute-level distances:

$$d(x_i, x_j) = w_{LLF} d_{LLF}(x_i, x_j) + w_A d_A(A(x_i), A(x_j)) \qquad \text{Equation 5}$$

where i and j index target and candidate images respectively, $w_{LLF}$ and $w_A$ weight the contributions of low-level features and semantic attributes, respectively, A(x) is the semantic attribute profile vector of the image x.

Since some semantic attributes are more informative than others, some semantic attributes are correlated (thereby reducing informativeness for re-identification), and some attributes are more reliably detected than others, then it is important to also optimize the attribute distance metric M:

$$d(x_i, x_j) = w_{LLF} d_{LLF}(x_i, x_j) + w_A (A(x_i) - A(x_j))^T M(A(x_i) - A(x_j)) \qquad \text{Equation 1}$$

where M may be a diagonal or full Mahalanobis matrix to encode weights for individual semantic attributes and attribute correlations respectively. This fusion can be significantly more effective than using either semantic attributes or LLFs alone as illustrated by the experimental results in FIG. 3. The above combined similarity metric can be optimized with gradient methods for $w_{LLF}$, $w_A$ and M to maximize the re-identification performance on a training set. For example, to optimize the expected-rank metric between a training probe set P and a gallery set G, the objective is to minimize is $$ER(w_{LLF}, w_A, M) = \frac{1}{P} \sum_{p \in P} \sum_{g \in G} \sigma_M(d_{pp} - d_{pg}) + \lambda |w - w_0|^2 \qquad \text{Equation 6}$$

where σ is the sigmoid function which makes the objective smooth, $d_{pp}$ is the distance (Equation 1) of the true matches, and $d_{pg}$ are the distances of the false matches and λ and $w_0$ are an optional regularizer strength and bias.

Figure 3:
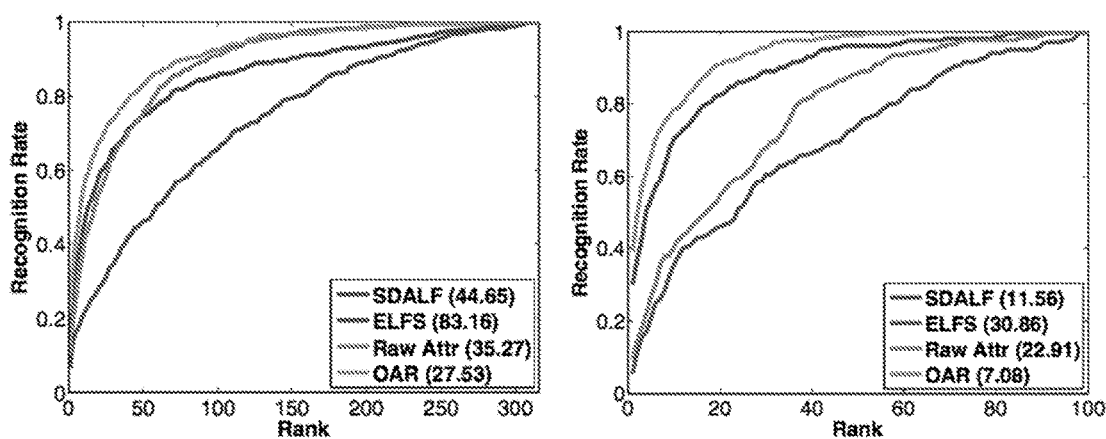
FIG. 3 shows graphical data displaying a comparison of the results generated from the system and method of FIG. 1 with results generated from other methods.

FIG. 3 shows cumulative match characteristic (CMC) curve testing results of a re-identification system (FIG. 1, 102 or FIG. 4, 270) on two standard benchmark datasets. The comparison is made using either LLFs alone (first term of Equations 1 and 5, denoted ELFS) or attributes alone (second term of Equations 1 and 5, denoted Raw Attr). Or a specific embodiment of the current invention which is the result of a combination of the two (Full Equations (1 and 5), denoted OAR), optimized using the machine learning objective equation 6. The learned combination of the two proposed here performs significantly better (bigger curve). These three cases are compared with a previous state of the art model, SDALF [16]. In each case expected rank of the true match for each model is shown in in brackets (lower is better).

Semantic attribute re-identification or any preferred LLF re-identification metric may be used in isolation in the re-identification module (as illustrated in FIG. 1). The use of semantic attributes alone in the re-identification module 103 has advantages over the prior art methods. However, preferably they should be used together with LLFs for improved re-identification accuracy. The semantic attribute term adds increased robustness to viewing condition covariates compared to existing LLF re-identification systems. Meanwhile, the LLF term adds increased robustness to changes of attributes. This in turn facilitates summarization features mentioned earlier such as summarizing attribute changes (see Summarization Feature 3 and item 104 in FIG. 1).

Note that this framework also provides the opportunity for the user to tune the re-identification process by specifying that it should be invariant to a target changing a specified semantic attribute (e.g., taking off a jacket). In this case the appropriate rows of the metric M are set to zero, and the presence or absence of a jacket does not affect the attribute similarity metric.

Figure 2:
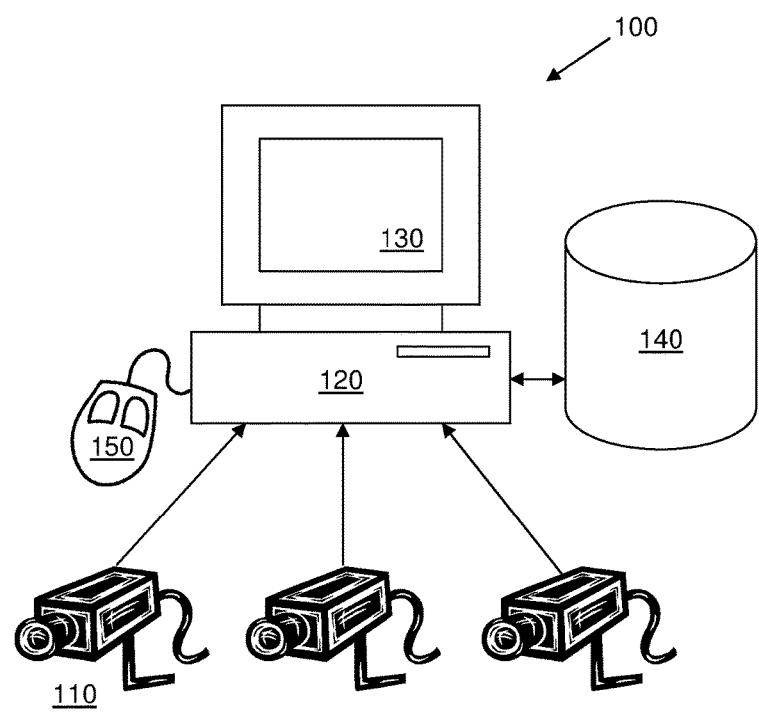
FIG. 2 shows a schematic diagram of apparatus used within the system and method of FIG. 1.

FIG. 2 illustrates schematically apparatus for implementing the method described with reference to FIG. 1. In particular, the system 100 includes sources of visual data 110 in the form of a plurality of video cameras (in this example). A computer system 120 implements the method steps and provides an output through a display screen 130. Database 140 stores information and data used to generate semantic attributes and includes example images (or those confirmed by a user or by machine learning techniques) that have associated know semantic attributes.

Pointing device 150, as well as a keyboard (not shown in this figure), allows a user to provide semantic attributes or other descriptive text to the system for use in searching and matching for candidate objects that match a target object.

FIG. 4 shows a flowchart of the method 200 for identifying candidate objects within visual data that match a target object. Target object attributes 210 and/or a target image 220 may be provided for generation of target semantic attributes 230 by the system. The target image 220 may be taken from visual data 205 to be searched or provided separately. These generated target semantic attributes 230 may be selected or generated by various methods, as described previously.

The visual data 205 may be analysed to identify candidate objects 240. Various different object identification schemes may be used for this purpose (e.g. including those shown in [14, 15]). For example, for each identified candidate object 240, a low-level descriptor may be generated 250. These low-level descriptors may be generated from the image data or from pixel data.

From the low-level descriptors of each candidate object, candidate semantic attributes are generated 260. These are then used at step 270 to match candidate semantic attributes to target semantic attributes. Any matches are outputted at step 280. If no matches (or no remaining matches) are found then the process is stopped at step 290. Advantageously, the present method and system use attributes (260) & LLFs (250) synergistically and with improved results. This is illustrated by the dashed (i.e. optional) line feeding LLFs 250 into the matching step 270 in FIG. 4.

As will be appreciated by the skilled person, details of the above embodiment may be varied without departing from the scope of the present invention, as defined by the appended claims.

For example, processing each video stream to detect objects may include performing re-identification of objects across space and time, summarizing the video according to a user-customizable criterion of attribute selection and a machine-guided quantization of measurable attribute.

The summarization may consists of filtering the video to show only the segments containing the nominated target person who has been re-identified across spaces and times (different camera views, locations and time zones).

The person nomination may be performed via entering an attribute description. The person may be nominated via providing an example detection or watch list image. The summary video may consist of the full segments containing the nominated person. The summary video may consist of a shorter clip from each segment. The summary video may consist of shorter segments showing just the transition between views.

The summarization may consist of filtering the video to show only the activities of people with a specified list of attributes. The summary may be generated as a batch query process. The summary may be generated interactively. The list of cameras to be searched may be constrained. The attribute profile may be specified with AND and OR operators. The full set of segments containing the specified attribute may be shown. A global subset of segments containing the specified attributes may be shown. A subset of segments containing the specified attributes within each camera may be shown. The segments may be shown or outputted sorted in order of confidence of detection of the specified attributes.

The summarization may consist of filtering the video based on combinations of identities, cameras and attributes. The summarization may consist of filtering the video based on a conjunction of identities. The summarization may consist of a filtering based on a specified conjunction of identity and intrinsic attributes. The summarization may consist of a filtering based on a specified attribute change. The summarization may consist of segments containing any attribute change. The summarization may consist of a conjunction of identity and extrinsic attributes. The summarization may consist of a conjunction of cameras. The summarization may be based on the statistics of identities and attributes. Typical attributes and attribute co-occurrence may be determined by clustering the attribute profiles of detected people. The clustering may be performed by mixture of Gaussians. The summarization may show the most typical examples overall. The summarization may show the most typical examples per cluster/category of person. The summarization may show the most atypical examples. The (a)typicality of examples may be evaluated globally across all cameras. The (a)typicality of examples may be evaluated on a per-camera basis.

The attribute detector module may be trained using machine learning methods. The attribute detectors may be realized by support vector machines. The attribute ontology may be generated automatically by image keywords. The attribute detector training data may be obtained by querying internet image databases by ontology keyword. The attribute ontology may be validated for effectiveness by pruning attributes with cross-validation accuracy below a threshold.

The re-identification may be provided using both attributes and low-level features. The re-identification objective may use both LLF and attribute cues. The re-identification objective may use a convex combination of LLF and attribute distance as in Equation (3).

The attribute distance metric may be optimized to maximize re-identification performance. The user can specify invariance to a particular attribute-change in the re-identification objective.

Whilst the described embodiments will work effectively with a single image (or portion of visual data) as the information describing the target object, multiple images (or portions of visual data) may be provided in order to improve the procedure and results.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

REFERENCES

1. Goldman et al, 2006, Schematic storyboarding for video visualization and editing, SIGGRAPH.
2. Lee et al, 2012, Discovering important people and objects for egocentric video summarization, CVPR.
3. Peleg et al, 2012, Method and System for Producing a Video Synopsis, U.S. Pat. No. 8,102,406 B2.
4. Pritch et al, 2008, Nonchronological Video Synopsis and Indexing, IEEE Transactions on Pattern Analysis and Machine Intelligence.
5. Feng et al, 2012, Online content-aware video condensation, CVPR.
6. Brown et al, 2012, Facilitating People Search in Video Surveillance, US Patent Application 2012/0030208 A1.
7. Brown et al, 2012, Attribute-based person tracking across multiple cameras, US Patent Application 2012/0026335 A1.
8. Chellappa et al, 2012, Remote identification of faces: Problems, prospects, and progress, Pattern Recognition Letters.
9. Prosser et al, 2010, Person Re-Identification by Support Vector Ranking, BMVC.
10. Yang & Ramanan, CVPR 2011, Articulated pose estimation with flexible mixtures-of-parts.
11. Xu, Gong and Hospedales, 2013, Artemis Workshop at ACM Multimedia.
12. Liu et al, CVPR 2012, Street-to-shop: Cross-scenario clothing retrieval via parts alignment and auxiliary set.
13. Layne, Hospedales and Gong, Attributes-based Re-Identification, Springer, to Appear, December 2013. (Annex A)
14. Felzenszwalb et al, IEEE PAMI 2010, Object detection with discriminatively trained part based models
15. Gong et al, 2010, ACM MM Workshop on Multimodal Pervasive Video Analysis, *Learning Human Pose in Crowd* (http://www.eecs.qmul.ac.uk/~sgg/papers/GongEtAl_ACM_MPVA2010.pdf)
16. Farenzena et al, CVPR 2010, Person Re-Identification by Symmetry-Driven Accumulation of Local Features

Annex A

R. Layne, T. Hospedales and S. Gong. Attributes-based Re-identification. In Gong, Cristani, Yan, Loy (Eds.), Person Re-Identification, Springer, January 2014.

Chapter 5
Attributes-Based Re-identification

Ryan Layne, Timothy M. Hospedales and Shaogang Gong

Abstract Automated person re-identification using only visual information from public-space CCTV video is challenging for many reasons, such as poor resolution or challenges involved in dealing with camera calibration. More critically still, the majority of clothing worn in public spaces tends to be non-discriminative and therefore of limited disambiguation value. Most re-identification techniques developed so far have relied on low-level visual-feature matching approaches that aim to return matching gallery detections earlier in the ranked list of results. However, for many applications an initial probe image may not be available, or a low-level feature representation may not be sufficiently invariant to viewing condition changes as well as being discriminative for re-identification. In this chapter, we show how mid-level "semantic attributes" can be computed for person description. We further show how this attribute-based description can be used in synergy with low-level feature descriptions to improve re-identification accuracy when an attribute-centric distance measure is employed. Moreover, we discuss a "zero-shot" scenario in which a visual probe is unavailable but re-identification can still be performed with user-provided semantic attribute description.

5.1 Introduction

Person re-identification, or *inter-camera entity association*, is the task of recognising an individual in diverse scenes obtained from non-overlapping cameras. In particular, for surveillance applications performed over space and time, an individual disappear-

---

R. Layne (✉) · T. M. Hospedales · S. Gong
Queen Mary University of London, London, UK
e-mail: rlayne@eecs.qmul.ac.uk T. M. Hospedales
e-mail: tmh@eecs.qmul.ac.uk S. Gong
e-mail: sgg@eecs.qmul.ac.uk S. Gong et al. (eds.), *Person Re-Identification*,
Advances in Computer Vision and Pattern Recognition,
DOI: 10.1007/978-1-4471-6296-4_5, © Springer-Verlag London 2014 ing from one view would need to be differentiated from numerous possible targets and matched in one or more other views at different locations and time. Potentially each view may be taken from a different angle, featuring different static and dynamic lighting conditions, degrees of occlusion and other view-specific variables.

Relying on manual re-identification in large camera networks is prohibitively costly and inaccurate. Operators are often assigned more cameras to monitor than what is optimal and manual matching can be prone to attentive gaps [19]. Moreover, baseline human performance is determined by individual operator's experience amongst other factors. It is difficult to transfer this expertise directly between operators without knowledge being affected by operator-bias [45].

As public space camera networks have grown quickly in recent years, there has also been an increasing interest in the computer vision community for developing automated re-identification solutions. These efforts have primarily focused on two strategies: (i) developing feature representations which are discriminative for identity, yet invariant to view angle and lighting [4, 12, 37] and (ii) learning methods to discriminatively optimise parameters of a re-identification model [50]. Until now, automated re-identification remains largely an unsolved problem due to the underlying challenge that most visual features are either insufficiently discriminative for cross-view entity association, especially with low resolution images, or insufficiently robust to viewing condition changes.

In this chapter, we take inspiration from the operating procedures of human experts [8, 33, 43] and recent research in attribute learning for classification [21] in order to introduce a new mid-level *semantic attribute* representation.

When performing person re-identification, human experts rely upon matching appearance or functional attributes that are discrete and unambiguous in interpretation, such as hair-style, shoe-type or clothing-style [33]. This is in contrast to the continuous and more ambiguous quantities measured by contemporary computer vision based re-identification approaches using visual features such as colour and texture [4, 12, 37]. This attribute-centric representation is similar to a description provided verbally to a human operator, e.g. by an eye-witness. We call this task attribute-profile identification, or *zero-shot re-identification*. Furthermore, we will show in our study that humans and computers have important differences in attribute-centric re-identification. In particular descriptive attributes that are favoured by humans may not be the most *useful* or *computable* for fully automated re-identification because of variance in the ability of computer vision techniques to detect each attribute and variability in how discriminative each attribute is across the entire population.

This approach of measuring similarity between attributes rather than within the feature-space has two advantages: (i) it allows re-identification (from a probe image) and identification (from a verbal description) to be performed in the same representational space and (ii) as attributes provide a very different type of information to low-level features, which can be considered as a separate modality, they can be fused together with low-level features to provide more accurate and robust re-identification.

5 Attributes-Based Re-identification

5.2 Problem Definitions

*5.2.1 The Re-identification Problem*

Contemporary approaches to re-identification typically exploit low-level features (LLFs) such as colour [29], texture, spatial structure [4], or combinations thereof [3, 13, 37], because they can be relatively easily and reliably measured, and provide a reasonable level of inter-person discrimination together with inter-camera invariance.

Once a suitable representation has been obtained, nearest-neighbour [4] or model-based matching algorithms such as support-vector ranking [37] may be used for re-identification. In each case, a distance metric (e.g. Euclidean or Bhattacharyya) must be chosen to measure the similarity between two samples. There is now a body of work on discriminatively optimising re-identification models or distance metrics [2, 15, 47, 50] as well as discriminatively learning the low-level features themselves [24]. Other complementary aspects of the re-identification problem have also been pursued to improve performance, such as improving robustness by combining multiple frames worth of features along a trajectory tracklet [3], between sets [48], in a group [46], and learning the topology of camera networks by learning inter-camera activity correlations [27] in order to reduce matching search space and hence reduce false-positives.

*5.2.2 Attributes as Representation*

Attribute-based modelling has recently been exploited to good effect in object [21] and action [11, 25] recognition. To put this in context: in contrast to low-level features or high-level classes or identities, attributes provide the mid-level *description* of both classes and instances. There are various unsupervised (e.g. PCA or topic-models) or supervised (e.g. neural networks) modelling approaches which produce data-driven mid-level representations. These techniques aim to project the data onto a basis set defined by the assumptions of the particular model (e.g. maximisation of variance, likelihood or sparsity). In contrast, attribute learning focuses on representing data instances by projecting them onto a basis set defined by domain-specific axes which are semantically meaningful to humans. Recent work in this area has also examined the exploitation of the constantly growing semantic web in order to automatically retrieve visual data correlating to relevant metatext [10] and vice-versa for visual retrieval using metatext queries [38].

Semantic attribute representations have various benefits: (i) In re-identification, a single pair of images may be available for each target—which can be seen as a challenging case of "one-shot" learning. In this case attributes can be more powerful than low-level features [21, 25, 41] because they provide a form of transfer learning as attributes are learned from a larger dataset *a priori*; (ii) they can be used synergistically in conjunction with raw data for greater effectiveness [25] and (iii) they are a suitable representation for direct human interaction, therefore allowing searches to be specified, initialised or constrained using human-labelled attribute-profiles [20, 21, 41].

5.2.3 Attributes for Identification

One view of attributes is as a type of transferable context [49] in that they provide auxiliary information about an instance to aid in (re-)identification. Here they are related to the study of soft-biometrics, which aims to enhance biometric identification performance with ancillary information [9, 18]. High-level features such as ethnicity, gender, age or indeed identity itself would be the most useful to us for re-identification. However, soft biometrics are exceptionally difficult to reliably compute in typical surveillance video as visual information is often impoverished and individuals are often at "stand-off distances" as well as in unconstrained or unknown viewing angles.

Alternatively attributes can be used for semantic attribute-profile identification (c.f. zero-shot learning [21]), in which early research has aimed to retrieve people matching a verbal attribute description from a camera network [43]. However, this has only been illustrated on relatively simple data with a small set of similarly-reliable facial attributes. We will illustrate in this study that one of the central issues for exploiting attributes for general automated (re)-identification is dealing with their unequal and variable informativeness and reliability of measurement from raw imagery data.

In this chapter, we move towards leveraging semantic mid-level attributes for automated person identification and re-identification. Specifically, we make four main contributions as follows. In Sect. 5.3.1, we introduce an ontology of attributes based on a subset from a human expert defined larger set [33]. These were selected for being relatively more reliable to compute whilst also discriminative for identification in typical populations. We evaluate our ontology from the perspective of both human-centric and automation-centric purposes and discuss considerations for successful ontology selection. In Sect. 5.3.6 we show how to learn an attribute-space distance metric to optimally weight attributes for re-identification, and do so in a synergistic way with low-level features. We evaluate our model in Sect. 5.4 and show significantly improved re-identification performance compared to conventional feature-based techniques on the two largest benchmark datasets. In the subsequent sections, we provide additional analysis and insight into the results, including contrast against zero-shot re-identification from attribute-profile descriptions.

5 Attributes-Based Re-identification

5.3 Computing Attributes for Re-identification

5.3.1 Ontology Selection

The majority of recent work on attributes looks to human expertise in answer to the question as to which attributes to learn. Typically, ontology selection is performed manually prior to research or via learning from existing metadata [5]. Hand-picked ontologies can be broadly categorised as top-down and bottom-up. In the top-down case, ontology selection may be predicated on the knowledge of experienced human domain-experts. In the latter, it may be based on the intuition of vision researchers, based on factors such as how detectable an attribute might be with available methods or data availability.

For the purposes of automated re-identification, we are concerned with descriptions that permit us to reliably discriminate; that is to say, we wish to eliminate identity ambiguity between individuals. Ontology selection therefore is guided by two factors: *computability* and *usefulness*. That is, *detectable* attributes, which can be detected reliably using current machine learning methods and available data [11], and *discriminative* (informative) attributes which, if known, would allow people to be effectively disambiguated [28].

The notion of discriminative attributes encompasses a nuance. Humans share a vast prior pool of potential attributes and experience. If required to describe a person in a way which uniquely identifies them against a gallery of alternatives, they typically choose a short description in terms of the rare attributes which uniquely discriminate the target individual (e.g. imperial moustache). In contrast, in the ideal discriminative ontology of attributes for automated processing, each attribute should be uncorrelated with all others, and should occur in exactly half of the population (e.g. male vs. female). In this way, no one attribute can distinguish a person uniquely, but together they effectively disambiguate the population: a "binary search" strategy. There are two reasons for this: constraining the ontology size and training data requirement.

*Ontology size*: Given a "binary search" ontology, any individual can be uniquely identified among a population of $n$ candidates with only an $O(\log(n))$ sized attribute ontology or description. In contrast, the single rare-attribute strategy favoured by people means that while a person may be identified with a short length 1 attribute description, an ontology size and computation size $O(n)$ may be required to describe, interpret and identify this person.

*Training data*: Given a "binary search" ontology, each training image may be re-used and be (equally) informative for all $n$ attributes (attributes are typically positive for half the images). In contrast, the single rare-attribute strategy would require an infeasible $n$ times as much training data, because different data would be needed for each attribute (e.g. finding a significant number of wearers of imperial moustaches) to train the detectors). In practice, rare attributes do not have enough training data to learn good classifiers, and are thus not reliably *detectable*. A final consideration is the visual subtlety of the attributes, which humans may be able to easily pick out Table 5.1 Our attribute ontology for re-identification

| Redshirt | Blueshirt | Lightshirt |
| --- | --- | --- |
| Darkshirt | Greenshirt | Nocoats |
| Not light dark jeans colour | Dark bottoms | Light bottoms |
| Hassatchel | Barelegs | Shorts |
| Jeans | Male | Skirt |
| Patterned | Midhair | Darkhair |
| Bald | Has handbag carrier bag | Has backpack | based on their lifetime of experience but which would require prohibitive amounts of training data as well as feature/classifier engineering for machines to detect.

Whether or not a particular ontology is detectable and discriminative cannot therefore be evaluated prior to examination of representative data. However, given a putative ontology and a representative and annotated training set, the detectability of the ontology can be measured by the test performance of the trained detectors whilst the discriminativeness of the ontology can be measured by the mutual information (MI) between the attributes and person identity. The question of how to trade off discriminativeness and detectability when selecting an ontology on the basis of maximum predicted performance is not completely clear [22, 23]. However, we will take some steps to address this issue in Sect. 5.3.6.

5.3.2 Ontology Creation and Data Annotation

Given the considerations discussed in the previous section, we select our ontology jointly based on four criteria. (i) We are informed by the operational procedures of human experts [33] as well as (ii) prioritising suitable findings from [22, 23, 38, 44], (iii) whether the ontology is favourably distributed in the data (binary search) and (iv) those which are likely to be detectable (sufficient training data and avoiding subtlety).

Specifically, we define the following space of $N_a$ = 21 binary attributes (Table 5.1). Ten of these attributes are related to colour, one to texture and the remaining ten are related to soft biometrics. Figure 5.1 shows a visual example of each attribute.[1]

Human annotation of attribute labels is costly in terms of both time and human effort. Due to the semantic nature of the attributes, accurate labelling can be especially challenging for cases where data are visually impoverished. Typically problems can arise where (i) ontology definition allows for ambiguity between members of the ontology and (ii) boundary cases are difficult for an annotator to binarily classify with confidence. These circumstances can be natural places for subjective labelling errors [42].

---

[1] We provide our annotations here: http://www.eecs.qmul.ac.uk/~rlayne/

5  Attributes-Based Re-identification

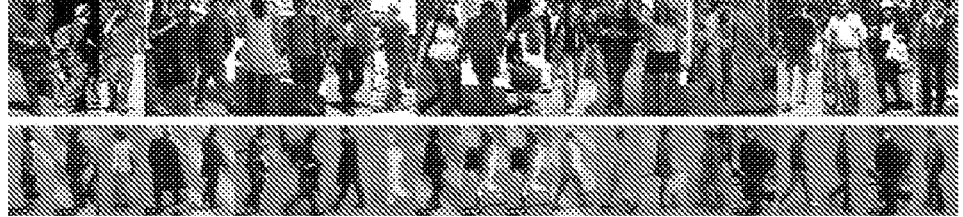

Fig. 5.1 Positive instances of our ontology from (*top*) the VIPeR and (*bottom*) the PRID datasets

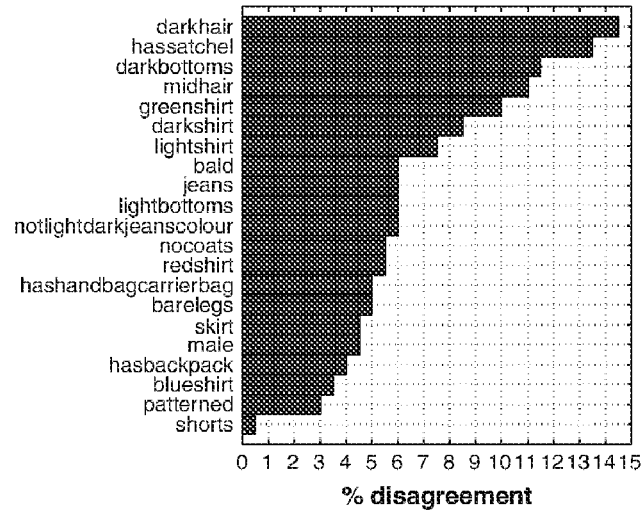

Fig. 5.2 Annotation disagreement error frequencies for two annotators on PRID

To investigate the significance of this issue, we independently double-annotated the PRID dataset [15] for our attribute ontology. Figure 5.2 illustrates frequency of label disagreements for each attribute in the PRID dataset measured as the Hamming distance between all annotations for that attribute across the dataset.

For attributes such as *shorts* or *gender*, uncertainty and therefore error is low. However, attributes whose boundary cases may be less well globally agreed upon can be considered to have the highest relative error between annotators. For example, in Fig. 5.2 attributes *hassatchel* and *darkhair* are most disagreed upon since lighting variations make determining darkness of hair difficult in some instances and satchel refers to a wide variety of rigid or non-rigid containers held in multiple ways. This means that attributes such as *darkhair* and *hassatchel* may effectively be subject to a significant rate of label noise [51] in the training data and hence perform poorly. This adds another source of variability in reliability of attribute detection which will have to be accounted for later. Figure 5.3 illustrates pairs of individuals in the PRID dataset whose shared attribute-profiles were the most disagreed upon. The figure highlights the extent of noise that can be introduced through semantic labelling errors, a topic we will revisit later in Sect. 5.3.6.

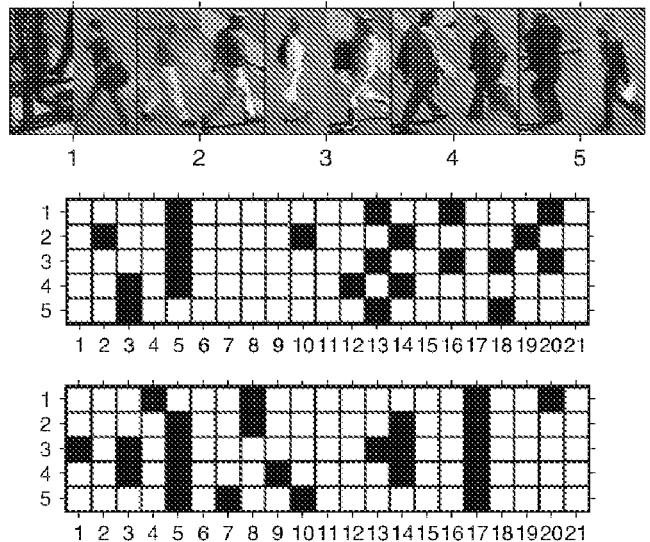

Fig. 5.3 Top five pairs of pedestrian detections in PRID where annotators disagreed most (*top row*). Annotator #1's labels (*middle*), annotator #2's labels (*bottom*). Each row is an attribute-profile for a pair of detections, columns are attributes and are arranged in the same order as Fig. 5.2

5.3.3 Feature Extraction

To detect attributes, we first select well-defined and informative low-level features with which to train robust classifiers. We wish to choose a feature which is also typically used for re-identification in order to enable later direct comparison between conventional and attribute-space re-identification in a way which controls for the input feature used. Typical descriptors used for re-identification include the Symmetry Driven Accumulation of Local Features (SDALF) [4] and Ensemble of Localised Features (ELF) [13].

The content of our ontology includes semantic attributes such as jeans, shirt colours, gender. We can infer that the information necessary for humans to distinguish these items is present visually, and wish to select a feature that incorporates information pertaining to colour, texture and spatial information. For our purposes, SDALF fulfils the requirements for our ontology but does not produce positive semi-definite distances, therefore ruling it out for classification using kernel methods. As a result, we therefore exploit ELF.

To that end, we first extract a 2784-dimensional low-level colour and texture feature vector denoted $x$ from each person image $I$ following the method in [37]. This consists of 464-dimensional feature vectors extracted from six equal sized horizontal strips from the image. Each strip uses eight colour channels (RGB, HSV and YCbCr) and 21 texture filters (Gabor, Schmid) derived from the luminance channel. We use 5 Attributes-Based Re-identification the same parameter choices for $\gamma$, $\lambda$, $\theta$ and $\sigma^2$ as proposed in [37] for Gabor filter extraction, and for $\tau$ and $\sigma$ for Schmid extraction. Finally, we use a bin size of 16 to quantise each channel.

5.3.4 Attribute Detection

Classifier Training and Attribute Feature Construction

We train Support Vector Machines (SVM) [40] to detect attributes. We use Chang et al.'s LIBSVM [6] and investigate Linear, RBF, $\chi^2$ and Intersection kernels. We select the intersection kernel as it compares closely with $\chi^2$ but is faster to compute.[2]

For each attribute, we perform cross validation to select values for the SVM's slack parameter $C$ from the set $C \in \{-10, \ldots, 10\}$ with increments of $\epsilon = 1$. The SVM scores are probability mapped, so each attribute detector $i$ outputs a posterior $p(a_i|x)$. We follow the standard approach for mapping SVM scores to posterior probabilities [36] as implemented by LIBSVM [6].

Spatial Feature Selection

Since some attributes (e.g. shorts) are highly unlikely to appear outside of their expected spatial location, one might ask whether it is possible to improve performance by discriminatively selecting or weighting the individual strips within the feature vector (Sect. 5.3.3). We experimented with defining a kernel for each strip as well as for the entire image, and training multi-kernel learning SVM using the DOGMA library with *Obscure* as classifiers [34, 35]. This approach discriminatively optimises the weights for each kernel in order to improve classifier performance and has been shown to improve performance when combining multiple features. However in this case, it did not reliably improve on the conventional SVM approach, presumably due to the relatively sparse and imbalanced training data being insufficient to correctly tune the inter-kernel weights.

---

[2] Our experiments on LIBSVM performance versus attribute training time show the intersection kernel as being a good combination of calculation time and accuracy. For example, training the attribute ontology results in 65.4% mean accuracy with 0.8 h training for the intersection kernel, as compared to the $\chi^2$ kernel (63.8% with 4.1 h), the RBF kernel (65.9% with 0.76 h and the linear kernel (61.8% with 1.2 h) respectively with LIBSVM. Although RBF is computed slightly faster and has similar accuracy, we select the intersection kernel overall, since the RBF kernel would require cross-validating over a second parameter. Providing LIBSVM with pre-built kernels reduces training time considerably in all cases.

Imbalanced Attribute Training

The prevalence of each attribute in a given dataset tends to vary dramatically and some attributes have a limited number of positive examples in an absolute sense as a result. This imbalance can cause discriminative classifiers such as SVMs to produce biased or degenerate results. There are various popular approaches to dealing with imbalanced data [14], such as synthesising further examples from the minority class to improve the definition of the decision boundary, for example using SMOTE [7] or weighting SVM instances or mis-classification penalties [1, 14]. However, neither of these methods outperformed simple subsampling in our case.

To avoid bias due to imbalanced data, we therefore simply train each attribute detector with all the positive training examples of that attribute, and obtain the same number of negative examples by sub-sampling the rest of the data at regular intervals.

Mid-Level Attribute Representation

Given the learned bank of attribute detectors, at test time we generate mid-level features as $1 \times N_a$ sized vectors of classification posteriors which we use to represent the probability that each attribute is present in the detection. Effectively we have projected the high dimensional, low-level features onto a mid-level, low-dimensional semantic attribute space. In particular, each person image is now represented in semantic attribute space by stacking the posteriors from each attribute detector into the $N_a$ dimensional vector: $A(x) = [p(a_1|x), \ldots, p(a_{N_a}|x)]^T$.

5.3.5 Attribute Fusion with Low-Level Features

To use our attributes for re-identification, we can define a distance solely on the attribute space, or use the attribute distance in conjunction with conventional distance between low-level features such as SDALF [4] and ELF [12]. SDALF provides state-of-the-art performance for a non-learning nearest-neighbour (NN) approach while ELF has been widely used by model-based learning approaches [37, 46]. We also use it as the feature for our attribute detectors in Sect. 5.3.3.

We therefore introduce a rather general formulation of a distance metric between two images $I_p$ and $I_g$ which combines both multiple attributes and multiple low-level features as follows:

$$d_{\mathbf{w}^L, \mathbf{w}^A}(I_p, I_g) = \sum_{l \in LL} w_l^L\, d_l^L\left(L_l(I_p), L_l(I_g)\right) + d_{\mathbf{w}^A}^A\left(A(I_p), A(I_g)\right). \tag{5.1}$$

Here Eq. (5.1) (first term) corresponds to the contribution from a set $LL$ of low-level distance measures, where $L_l(I_p)$ denotes extraction of type $l$ low-level features from image $I_p$, $d_l^L$ denotes the distance metric defined for low-level feature type $l$, and $w_l^L$ is a weighting factor for each feature type $l$. Eq. (5.1) (second term) corresponds 5 Attributes-Based Re-identification to the contribution from our attribute-based distance metrics. Where $A(I_p)$ denotes the attribute encoding of image $I_p$. For the attribute-space distance we experiment with two metrics: weighted L1 (Eq. (5.2)) and weighted Euclidean (Eq. (5.3)).

$$d^A_{\mathbf{w}^A}(I_p, I_g) = (\mathbf{w}^A)^T \left|\left(A(x_p) - A(x_g)\right)\right|, \qquad (5.2)$$

$$d^A_{\mathbf{w}^A}(I_p, I_g) = \sqrt{\sum_i w^A_i \left(p(a_i|x_p) - p(a_i|x_g)\right)^2}. \qquad (5.3)$$

5.3.6 Attribute Selection and Weighting

As discussed earlier, all attributes are not equal due to variability in how reliably they are measured due to imbalance, subtlety (detectability) and how informative they are about identity (discriminability). How to account for variable detectability and discriminability of each attribute ($\mathbf{w}^A$), and how to weight attributes relative to low-level features ($\mathbf{w}^{LL}$) are important challenges, which we discuss now.

Exhaustively searching the $N_a$ dimensional space of weights directly to determine attribute selection and weighting is computationally intractable. However, we can reformulate the re-identification task as an optimisation problem and apply standard optimisation methods [32] to search for a good configuration of weights.

Importantly, we only search $|\mathbf{w}^A| = N_a = 21$ parameters for the within-attribute-space metric $d^A_{\mathbf{w}^A}(\cdot, \cdot)$. and one or two parameters for weighting attributes relative to low-level features. In contrast to previous learners for low-level features [37, 47, 50], which must optimise 100s or 1,000s of parameters, this gives us considerable flexibility in terms of computation requirement of the objective.

An interesting question is therefore what is the ideal criterion for optimisation. Previous studies have considered optimising, e.g. relative rank [37] and relative distance [15, 50]. While effective, these metrics are indirect proxies for what the re-identification application ultimately cares about, which is the average rank of the true match to a probe within the gallery set, which we call Expected Rank (ER). That is, how far does the operator have to look down the list before finding the target. See Sect. 5.4 for more discussion.

We introduce the following objective for ER:

$$ER = \frac{1}{|P|} \sum_{p \in P} \sum_{g \in G} L_w \left(D_{pp}, D_{pg}\right) + \lambda \parallel \mathbf{w} - \mathbf{w}_0 \parallel, \qquad (5.4)$$

where $D_{pg}$ is the matrix of distances (Eqs. (5.1)) from probe image $p$ to gallery image $g$; $L$ is a loss function, which can penalise the objective according to the relative distance of the true match $D_{pp}$ versus false matches $D_{pg}$; and $\mathbf{w}_0$ is a regulariser bias with strength $\lambda$. To complete the definition of the objective, we define the loss function $L$ as in Eq. (5.5). That is, imposing a penalty every time a false match is ranked ahead of the true match. (I is an indicator function which returns 1 when the parameter is

| Algorithm 1 Attributes-based re-identification |
| --- |
| Training |
| for all Attribute do |
|     Subsample majority class to length of minority class |
|     Cross-validate to obtain parameter $C$ that gives best average accuracy. |
|     Retrain SVM on all training data with selected $C$ |
| end for |
| Determine inter and intra-attribute weighting w by minimising Eq. (5.4). |
| |
| Testing (Re-identification) |
| for all Person $x_g \in$ gallery set do |
|     Classify each attribute $a$ |
|     Stack attribute posteriors into person signature $A(x_g)$. |
| end for |
| for all Person $x_p \in$ probe set do |
|     Classify each attribute $a$ |
|     Stack attribute posteriors into person signature $A(x_p)$. |
|     Compute distance to gallery set fusing attribute and LLF cues with weight w. (Eq. (5.1)) |
|     Nearest-neighbour re-identification in gallery according to their similarity to person $x_p$. |
| end for | true.) The overall objective (Eq. (5.4)) thus returns the ER of the true match. This is now a good objective, because it directly reflects the relevant end-user metric for effectiveness of the system. However it is hard to efficiently optimise because it is non-smooth: a small change to the weights w may have exactly zero change to the ER (the optimisation surface is piece-wise linear). We therefore soften this loss-function using a sigmoid, as in Eq. (5.6), which is now smooth and differentiable. This finally allows efficient gradient-based optimisation with Newton [26] or conjugate-gradient methods [32].

$$L_\mathbf{w}^{HardRank,ER} = \mathbf{1}\left(d_{pp} - d_{pg} > 0\right). \tag{5.5}$$

$$L_\mathbf{w}^{Sigmoid,ER} = \sigma\left(d_{pp} - d_{pg}\right). \tag{5.6}$$

We initialise $w_{initial} = 1$. To prevent over fitting, we use regularisation parameters $w_0 = 1$, and $\lambda = 0.2$ (i.e. everything is assumed to be equal a priori) and set the sigmoid scale to $k = 32$. Finally for fusion with low-level features (Eq. (5.1)), we use both SDALF and ELF.

In summary, this process uses gradient-descent to search for a setting of weights w for each LLF and for each attribute (Eq. (5.1)) that will (locally) minimise the ER within the gallery of the true match to each probe image (Eq. (5.4)). See Algorithm 1 for an overview of our complete system.

5 Attributes-Based Re-identification

5.4 Experiments

*5.4.1 Datasets*

We select two challenging datasets with which to validate our model, VIPeR [12] and PRID [15]. VIPeR contains 632 pedestrian image pairs from two cameras with different viewpoint, pose and lighting. Images are scaled to 128×48 pixels. We follow [4, 12] in considering Cam B as the gallery set and Cam A as the probe set. Performance is evaluated by matching each test image in Cam A against the Cam B gallery.

PRID is provided as both multi-shot and single-shot data. It consists of two camera views overlooking an urban environment from a distance and from fixed viewpoints. As a result PRID features low pose variability with the majority of people captured in profile. The first 200 shots in each view correspond to the same person, however the remaining shots only appear once in the dataset. To maximise comparability with VIPeR, we use the single-shot version and use the first 200 shots from each view. Images are scaled to 128×64 pixels.

For each dataset, we divide the available data into training, validation and test partitions. We initially train classifiers and produce attribute representations from the training portion, and then optimise the attribute weighting as described in Sect. 5.3.6 using the validation set. We then retrain the classifiers on both the training and validation portions, while re-identification performance is reported on the held out test portion.

We quantify re-identification performance using three standard metrics and one less common one metric. The standard re-identification metrics are performance at rank $n$, cumulative matching characteristic (CMC) curves and normalised area under the CMC curve [4, 12]. Performance at rank $n$ reports the probability that the correct match occurs within the first $n$ ranked results from the gallery. The CMC curve plots this value for all $n$, and the nAUC summarises the area under the CMC curve (so perfect nAUC is 1.0 and chance nAUC is 0.5).

We additionally report ER, as advocated by Avraham et al. [2] as CMC Expectation. The ER reflects the mean rank of the true matches and is a useful statistic for our purposes; in contrast to the standard metrics, lower ER scores are more desirable and indicate that on average the correct matches are distributed more toward the lower ranks. (So perfect ER is 1 and random ER would be half the gallery size). In particular, ER has the advantage of a highly relevant practical interpretation: it is the average number of returned images the operator will have to scan before reaching the true match.

We compare the following re-identification methods: (1) SDALF [4] using code provided by the authors (note that SDALF is already shown to decisively outperform [13]); (2) ELF: Prosser et al.'s [37] spatial variant of ELF [12] using Strips of ELF; (3) Attributes: Raw attribute based re-identification (Euclidean distance); (4) Optimised Attribute Re-identification (OAR): our Optimised Attribute based Re-identification method with weighting between low-level features and within attributes learned by directly minimising the ER (Sect. 5.3.6).

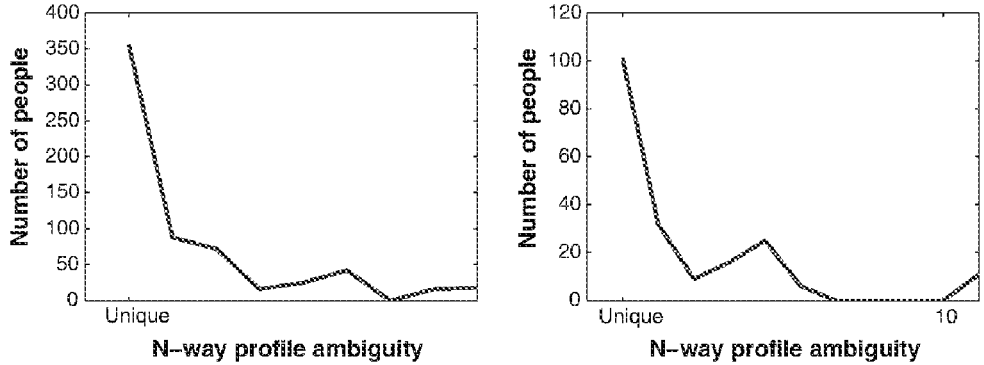

Fig. 5.4 Uniqueness of attribute descriptions in a population, i VIPeR and ii PRID. The peak around unique shows that most people are uniquely identifiable by attributes

5.4.2 Attribute Analysis

We first analyse the intrinsic discriminative potential of our attribute ontology independently of how reliably detectable the attributes are (assuming perfect detectability). This analysis plays provides an upper bound of performance that would be obtainable with sufficiently advanced attribute detectors. Fig. 5.6 reports the prevalence of each attribute in the datasets. Many attributes have prevalence near to 50 %, which is reflected in their higher MI with person identity. As we discussed earlier this is a desirable property because it means each additional attribute known can potentially halve the number of possible matches. Whether this is realised or not depends on if attributes are correlated/redundant, in which case each additional redundant attribute provides less marginal benefit. To check this we compute the correlation coefficient between all attributes, and found that the average inter-attribute correlation was only 0.07. We therefore expect the attribute ontology to be effective.

Figure 5.4 shows a histogram summarising how many people are uniquely identifiable solely by attributes and how many would be confused to a greater or lesser extent. The peak around unique/unambiguous shows that a clear majority of people can be uniquely or otherwise near-uniquely identified by their attribute-profile alone, while the tail shows that there are a small number of people with very generic profiles. This observation is important; near-uniqueness means that approaches which rank distances between attribute-profiles are still likely to feature the correct match high enough in the ranked list to be of use to human operators.

The CMC curve (for gallery size $p = 632$) that would be obtained assuming perfect attribute classifiers is shown in Fig. 5.5. This impressive result (nAUC near a perfect score of 1.0) highlights the potential for attribute-based re-identification. Also shown are the results with only the top five or 10 attributes (sorted by MI with identity), and a random 10 attributes. This shows that: (i) as few as 10 attributes are sufficient if they are good (i.e. high MI) and perfectly detectable, while five is too few and (ii) attributes with high MI are significantly more useful than low MI (always present or absent) attributes (Fig. 5.6).

5 Attributes-Based Re-identification

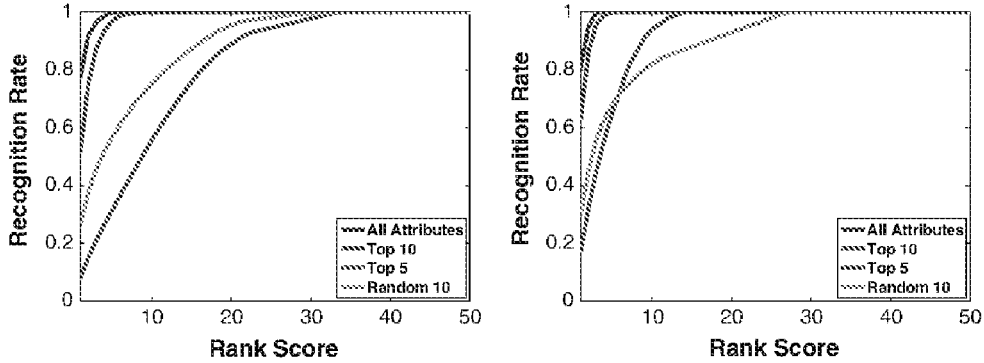

Fig. 5.5 Best-case (assuming perfect attribute detection) re-identification using attributes with highest $n$ ground-truth MI scores, i VIPeR and ii PRID

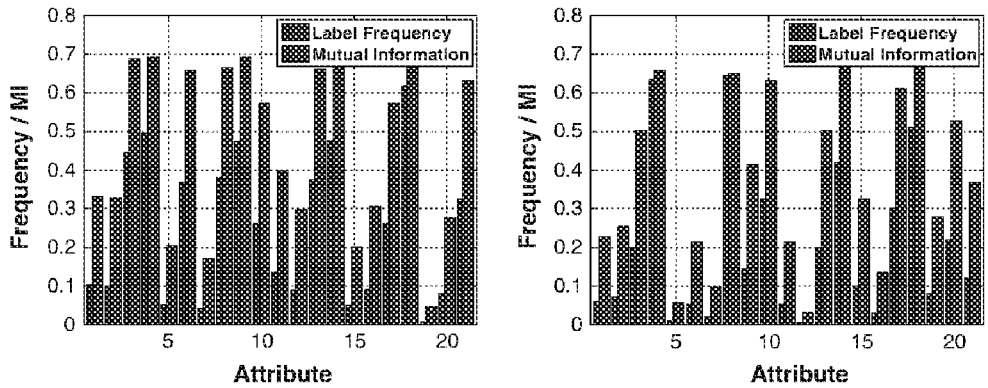

Fig. 5.6 Attribute occurrence frequencies and Attribute MI scores in VIPeR (*left*) and PRID (*right*)

5.4.3 Attribute Detection

Given the analysis of the intrinsic effectiveness of the ontology in the previous section, the next question is whether the selected attributes can indeed be detected or not. Attribute detection on both VIPeR and PRID achieves reasonable levels on both balanced and unbalanced datasets as seen in Table 5.2. (dash indicates failure to train due to insufficient data). For all datasets, a minimum of nine classifiers can be trained on unbalanced PRID, and 16 on unbalanced VIPeR, in both cases some attribute classifiers are unable to train due to extreme class imbalances or data sparsity. Average accuracies for these datasets are also reasonable; 66.9 % and 68.3 % respectively. The benefit of sub-sampling negative data for attribute learning is highlighted in the improvement for the balanced datasets. Balancing in this case increases the number of successfully trained classifiers to 20 for balanced VIPeR and Table 5.2 Attribute classifier training and test accuracies (%) for VIPeR and PRID, for both the balanced (b) and unbalanced (ub) datasets

| | VIPeR (u) | VIPeR (b) | PRID (u) | PRID (b) |
|---|---|---|---|---|
| Redshirt | 79.6 | 80.9 | – | 41.3 |
| Blueshirt | 62.7 | 68.3 | – | 59.6 |
| Lightshirt | 80.6 | 82.2 | 81.6 | 80.6 |
| Darkshirt | 82.2 | 84.0 | 79.0 | 79.5 |
| Greenshirt | 57.3 | 72.1 | – | – |
| Nocoats | 68.5 | 69.7 | – | 31.3 |
| Not light dark jeans colour | 57.6 | 69.1 | – | – |
| Dark bottoms | 74.4 | 75.0 | 72.2 | 67.3 |
| Light bottoms | 75.3 | 74.7 | 76.0 | 74.0 |
| Hassatchel | – | 56.0 | 51.9 | 55.0 |
| Barelegs | 60.4 | 74.4 | – | 50.2 |
| Shorts | 53.1 | 76.1 | – | – |
| Jeans | 73.6 | 78.0 | 57.1 | 69.4 |
| Male | 66.7 | 68.0 | 52.1 | 54.0 |
| Skirt | – | 68.8 | – | 44.6 |
| Patterned | – | 60.8 | – | – |
| Midhair | 55.2 | 64.6 | 69.4 | 70.4 |
| Dark hair | 60.0 | 60.0 | 75.4 | 75.4 |
| Bald | – | – | – | 40.2 |
| Has handbag carrier bag | – | 54.5 | – | 59.4 |
| Has backpack | 63.4 | 68.6 | – | 48.3 |
| Mean | 66.9 | 70.3 | 68.3 | 66.2 |

16 on balanced PRID with mean accuracies rising to 70.3 % for VIPeR. Balancing slightly reduces classification performance on PRID to an average of 66.2 %.

5.4.4 Using Attributes to Re-identify

Given the previous analysis of discriminability and detectability of the attributes, we now address the central question of attributes for re-identification. We first consider vanilla attribute re-identification (no weighting or fusion; $w^L = 0$, $w_a = 1$ in Eq. (5.1)). The re-identification performance of attributes alone is summarised in Table 5.3 in terms of ER. There are a few interesting points to note: (i) In most cases using $L2$ NN matching provides lower ER scores than $L1$ NN matching. (ii) On VIPeR and PRID, SDALF outperforms the other low-level features, and outperforms our basic attributes in VIPeR. (iii) Although the attribute-centric re-identification uses the *same low-level input features* (ELF), and the same $L1/L2$ NN matching strategy, attributes decisively outperform raw ELF. We can verify that this large difference is due to the semantic attribute space rather than the implicit dimensionality reduction effect of attributes by performing Principle Components Analysis (PCA) on ELF

5 Attributes-Based Re-identification

Table 5.3 Re-identification performance, we report ER scores for VIPeR (left, gallery size $p = 316$) and PRID (right, gallery size $p = 100$) and compare different features and distance measures against our balanced attribute-features prior to fusion and weight selection.

| VIPeR | L1 | L2 |
|---|---|---|
| ELF [37] | 84.3 | 72.1 |
| ELF PCA | 85.3 | 74.5 |
| Raw attributes | 34.4 | 37.8 |
| SDALF [4] | 44.0 | |
| Random chance | 158 | |
| PRID | L1 | L2 |
| ELF | 28.2 | 37.0 |
| ELF PCA | 32.7 | 38.1 |
| Raw attributes | 24.1 | 24.4 |
| SDALF [4] | 31.8 | |
| Random chance | 50 | |

Smaller values indicate better re-identification performance to reduce its dimensionality to the same as our attribute space ($N_a = 21$). In this case the re-identification performance is still significantly worse than the attribute-centric approach (See Table 5.3). The improvement over raw ELF is thus due to the attribute-centric approach.

5.4.5 Re-identification with Optimised Attributes

Given the promising results for vanilla attribute re-identification in the previous section, we finally investigate whether our complete model (including discriminative optimisation of weights to improve ER) can further improve performance. Figure 5.7 and Table 5.4 summarise final re-identification performance. In each case, optimising the attributes with the distance metric and fusing with low-level SDALF and ELF improves re-identification uniformly compared to using attributes or low-level features alone. Our approach improves ER by 38.3 and 35 % on VIPeR, and 38.8 and 46.5 % on PRID for the balanced and unbalanced cases vs. SDALF and 66.9, 65.1, 77.1 and 80 % versus ELF features.

Critically for re-identification scenarios, the most important rank 1 accuracies are improved convincingly. For VIPeR, OAR improves 40 % over SDALF in the balanced case, and 33.3 % for unbalanced data. For PRID, OAR improves by 30 and 36.6 %. As in the case of ER, rank is uniformly improved, indicating the increased likelihood that correct matches appear more frequently at earlier ranks using our approach.

The learned weights for fusion between our attributes and low-level features indicate that SDALF is informative and useful for re-identification on both datasets. In contrast, ELF is substantially down-weighted to 18 % compared to SDALF on PRID

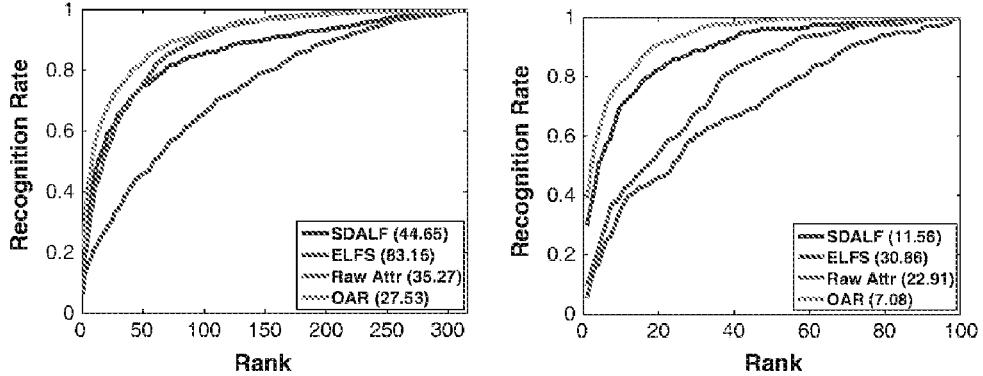

Fig. 5.7 Final attribute re-identification CMC plots for i VIPeR and ii PRID, gallery sizes $p = 316$, $p = 100$. ER is given in parentheses Table 5.4 Final attribute re-identification performance

| VIPeR | ER | Rank 1 | Rank 5 | Rank 10 | Rank 25 | nAUC |
|---|---|---|---|---|---|---|
| Farenzena et al. [4] | 44.7 | 15.3 | 34.5 | 44.3 | 61.6 | 0.86 |
| Prosser et al. [37] | 83.2 | 6.5 | 16.5 | 21.0 | 30.9 | 0.74 |
| Raw attributes (b) | 35.3 | 10.0 | 26.3 | 39.6 | 58.4 | 0.89 |
| OAR (b) | 27.5 | 21.4 | 41.5 | 55.2 | 71.5 | 0.94 |
| Raw attributes (u) | 40.4 | 6.5 | 23.9 | 34.8 | 55.9 | 0.88 |
| OAR (u) | 29.0 | 19.6 | 39.7 | 54.1 | 71.2 | 0.91 |
| PRID | ER | Rank 1 | Rank 5 | Rank 10 | Rank 25 | nAUC |
| Farenzena et al. | 11.6 | 30.0 | 53.5 | 70.5 | 86.0 | 0.89 |
| Prosser et al. | 30.9 | 5.5 | 21.0 | 35.5 | 52.0 | 0.70 |
| Raw attributes (b) | 22.9 | 9.5 | 27.0 | 40.5 | 60.0 | 0.78 |
| OAR (b) | 7.1 | 39.0 | 66.0 | 78.5 | 93.5 | 0.93 |
| Raw attributes (u) | 20.8 | 8.5 | 28.5 | 44.0 | 69.0 | 0.80 |
| OAR (u) | 6.2 | 41.5 | 69.0 | 82.5 | 95.0 | 0.95 |

We report ER scores [2] (lower scores indicate that overall, an operator will find the correct match appears lower down the ranks), Cumulative Match Characteristic (CMC) and normalised Area-Under-Curve (nAUC) scores (higher is better, the maximum nAUC score is one). We further report accuracies for our approach using unbalanced data for comparison and on VIPeR, disabled entirely. This makes sense because SDALF is at least twice as effective as ELF for VIPeR (Table 5.3).

The intra-attribute weights (Fig. 5.8) are relatively even on PRID but more varied on VIPeR where the highest weighted attributes (*jeans, hasbackpack, nocoats, midhair, shorts*) are weighted at 1.43, 1.20, 1.17, 1.10 and 1.1; while the least informative attributes are *barelegs, lightshirt, greenshirt, patterned* and *hassatchel* which are weighted to 0.7, 0.7, 0.66, 0.65 and 0.75. Jeans is one of the attributes that is detected most accurately and is most common in the datasets, so its weight is expected to be high. However the others are more surprising, with some of the most accurate attributes such as *darkshirt* and *lightshirt* weighted relatively low (0.85 and

5 Attributes-Based Re-identification

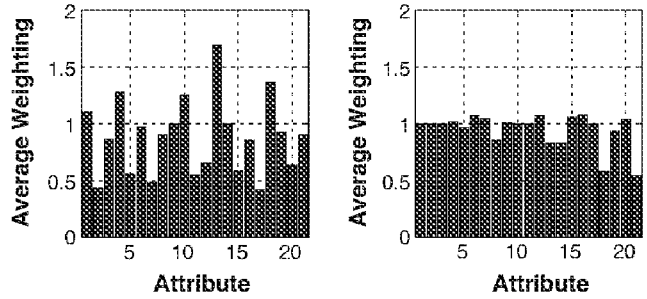

Fig. 5.8 Final attribute feature weights for VIPeR (*left*) and PRID (*right*)

Table 5.5 Comparison of results between our OAR method and other state-of-art results for the VIPeR dataset

| VIPeR | Rank 1 | Rank 10 | Rank 20 | Rank 50 | nAUC |
|---|---|---|---|---|---|
| OAR | 21.4 | 55.2 | 71.5 | 82.9 | 0.92 |
| Hirzer et al.[16] | 22.0 | 63.0 | 78.0 | 93.0 | - |
| Farenzena et al.[4] | 9.7 | 31.7 | 46.5 | 66.6 | 0.82 |
| Hirzer et al.[17] | 27.0 | 69.0 | 83.0 | 95.0 | - |
| Avraham et al.[2] | 15.9 | 59.7 | 78.3 | - | - |
| Zheng et al.[47, 50] | 15.7 | 53.9 | 70.1 | - | - |
| Prosser et al.[37] | 14.6 | 50.9 | 66.8 | - | - |

0.7). For PRID, *darkshirt, skirt, lightbottoms, lightshirt* and *darkbottoms* are most informative (1.19, 1.04, 1.02 and 1.03); *darkhair, midhair, bald, jeans* are the least (0.78, 0.8, 0.92, 0.86).

Interestingly, the most familiar indicators which might be expected to differentiate good versus bad attributes are not reflected in the final weighting. Classification accuracy, annotation error (label noise) and MI are not significantly correlated with the final weighting, meaning that some unreliably detectable and rare/low MI attributes actually turn out to be *useful* for re-identification with low ER; and vice versa. Moreover, some of the weightings vary dramatically between dataset, for example, the attribute *jeans* is the strongest weighted attribute on VIPeR, however it is one of the lowest on PRID despite being reasonably accurate and prevalent on both datasets. These two observations both show (i) the necessity of jointly learning a combined weighting for all the attributes, (ii) doing so with a relevant objective function (such as ER) and (iii) learning a model which is adapted for the statistics of each given dataset/scenario.

In Table 5.5, we compare our approach with the performance other methods as reported in their evaluations. In this case, the cross-validation folds are not the same, so the results are not exactly comparable, however they should be indicative. Our approach performs comparably to [16] and convincingly compared to [4, 47, 50] and [37]. Both [17] and [2] exploit pairwise learning; in [2] a binary classifier is trained on correct and incorrect pairs of detections in order to learn the projection from one camera to another, in [17] incorrect (i.e. matches that are nearer to the probe than the

5.4.6 Zero-shot Identification

In Sect. 5.4.2 we showed that with perfect attribute detections, highly accurate re-identification is possible. Even with merely 10 attributes, near-perfect re-identification can be performed. Zero-shot identification is the task of generating an attribute-profile either manually or from a different modality of data, then matching individuals in the gallery set via their attributes. This is highly topical for surveillance: consider the case where a suspect is escaping through a public area surveilled by CCTV. The authorities in this situation may have enough information build a semantic-attribute-profile of the suspect using attributes taken from eyewitness descriptions.

In zero-shot identification (a special case of re-identification), we replace the probe image with a manually specified attribute description. To test this problem setting, we match the ground truth attribute-profiles of probe persons against their inferred attribute-profiles in the gallery as in [43].

An interesting question one might ask is whether this is expected to be better or worse than conventional attribute-space re-identification based on attributes detected from a probe *image*. One might expect zero-shot performance to be better because we know that in the absence of noise, attribute re-identification performs admirably (Sect. 5.4.2 and Fig. 5.5)—and there are two sources of noise (attribute detection inaccuracies in the probe and target images) of which the former noise source has been removed in the zero-shot case. In this case, a man-in-the-loop approach to querying might be desirable, even if a probe image is available. That is, the operator could quickly indicate the ground-truth attributes for the probe image and search based on this (noise-free) ground-truth.

Table 5.6 shows re-identification performance for both datasets. Surprisingly, while the performance is encouraging, it is not as compelling as when the profile is constructed by our classifiers, *despite the elimination of the noise on the probe images*.

This significant difference between the zero-shot case we outline here and the conventional case we discuss in the previous section turns out to be because of *noise correlation*. Intuitively, consider that if someone with a hard-to-classify hairstyle is classified in one camera with some error ($p(a_{hair}|x) - a_{hair}^{true}$), then this person might also be classified in another camera with an error *in the same direction*. In this case, using the ground-truth attribute in one camera will actually be detrimental to re-identification performance (Fig. 5.9).

To verify this explanation, we perform Pearson's product-moment correlation analysis on the error (difference between ground-truth labels and the predicted attributes) between the probe and gallery sets. The average cross-camera error correlation coefficient is 0.93 in VIPeR and 0.97 in PRID, and all of the correlation coefficients were statistically significant ($p < 0.05$).

5 Attributes-Based Re-identification

Table 5.6 Zero-shot re-identification results for VIPeR and PRID

|         | Exp Rank | Rank 1 | Rank 5 | Rank 10 | Rank 25 |
|---------|----------|--------|--------|---------|---------|
| VIPER (u) | 50.1 | 6.0 | 17.1 | 26.0 | 48.1 |
| VIPER (b) | 54.8 | 5.4 | 14.9 | 25.3 | 44.9 |
| PRID (u)  | 19.2 | 8.0 | 29.0 | 47.0 | 73.0 |
| PRID (b)  | 26.1 | 3.0 | 16.0 | 32.0 | 62.0 |

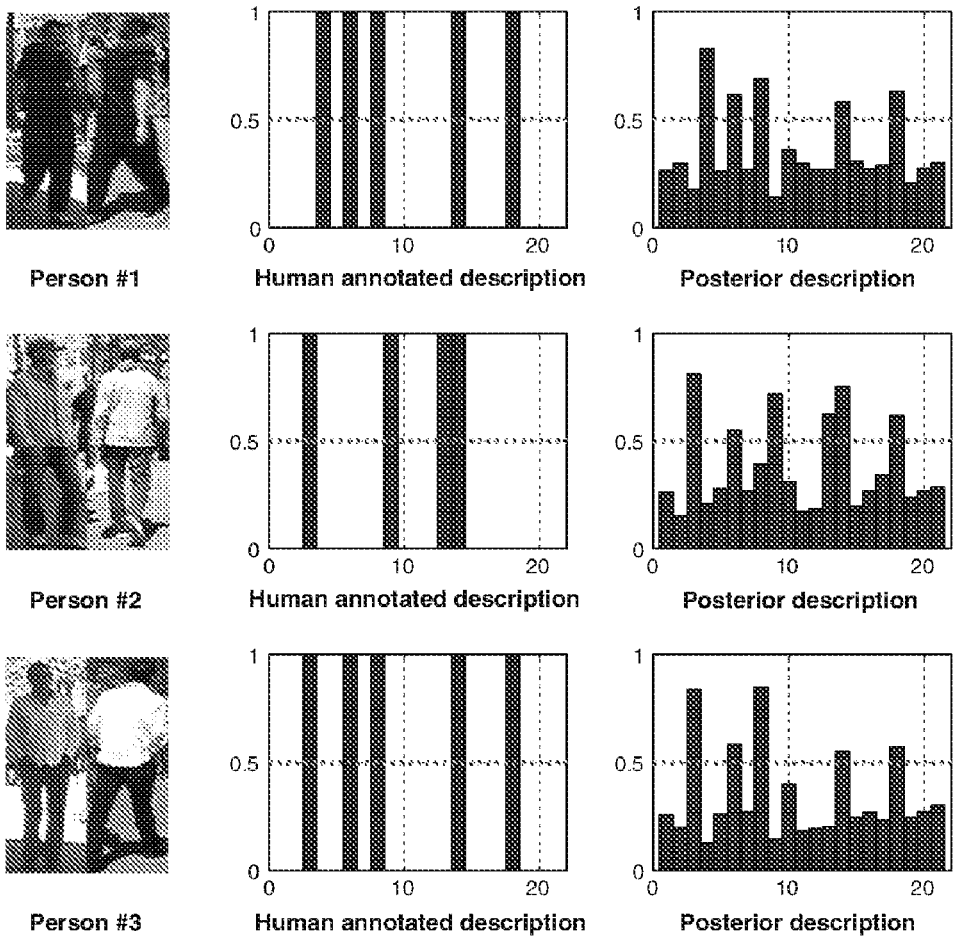

Fig. 5.9 Success cases for zero-shot re-identification on VIPeR. The *left* column shows two probe images; i is the image annotated by a human operator and ii is the correct rank #1 match as selected by our zero-shot re-identification system. The human-annotated probe descriptions (*middle*) and the matched attribute-feature gallery descriptions (*right*) are notably similar for each person; the attribute detections from the gallery closely resemble the human-annotated attributes (particularly those above *red* line)

Although these results show that man-in-the-loop zero-shot identification—if intended to replace a probe image—may not always be beneficial, it is still evident that zero-shot performs reasonably in general and is a valuable capability for the case where descriptions are verbal rather than extracted from a visual example.

5.5 Conclusions

We have shown how mid-level attributes trained using semantic cues from human experts [33] can be an effective representation for re-identification and (zero-shot) identification. Moreover, this provides a different modality to standard low-level features and thus synergistic opportunities for fusion.

Existing approaches to re-identification [4, 12, 37] focus on high-dimensional low-level features which aim to be discriminative for identity yet invariant to view and lighting. However, these variance and invariance properties are hard to obtain simultaneously, thus limiting such features' effectiveness for re-identification. In contrast, attributes provide a low-dimensional mid-level representation which is discriminative by construction (see Sect. 5.3.1) and makes no strong view invariance assumptions (variability in appearance of each attribute is learned by the classifier with sufficient training data)

Importantly, although individual attributes vary in robustness and informativeness, attributes provide a strong cue for identity. Their low-dimensional nature means they are also amenable to discriminatively learning a good distance metric, in contrast to the challenging optimisation required for high-dimensional LLFs [47, 50]. In developing a separate cue-modality, our approach is potentially complementary to the majority of existing approaches, whether focused on low-level features [4], or learning methods [47, 50]

The most promising direction for future research is improving the attribute-detector performance, as evidenced by the excellent results in Fig. 5.5 using ground-truth attributes. The more limited empirical performance is due to lack of training data, which could be addressed by transfer learning to deploy attribute detectors trained on large databases (e.g. web-crawls) on to the re-identification system (Fig. 5.9).

5.6 Further Reading

Interested readers may wish to refer to the following material:

- [32] for a comprehensive overview of continuous optimisation methods.
- [31] for detailed exposition and review of contemporary features and descriptors.
- [30] discusses classifier training and machine learning methods.
- [39] for trends on surveillance hardware development.

Acknowledgments The authors shall express their deep gratitude to Colin Lewis of the UK MOD SA(SD) who made this work possible and to Toby Nortcliffe of the UK Home Office CAST for providing human operational insight. We also would like to thank Richard Howarth for his assistance in labelling datasets.

5 Attributes-Based Re-identification

References

1. Akbani, R., Kwek, S., Japkowicz, N.: Applying support vector machines to imbalanced datasets. In: European Conference on Machine Learning (2004)
2. Avraham, T., Gurvich, I., Lindenbaum, M., Markovitch, S.: Learning implicit transfer for person re-identification. In: European Conference on Computer Vision, First International Workshop on Re-identification, Florence (2012)
3. Bazzani, L., Cristani, M., Perina, A., Murino, V.: Multiple-shot person re-identification by chromatic and epitomic analyses. Pattern Recogn. Lett. 33(7), 898–903 (2012)
4. Bazzani, L., Cristani, M., Murino, V.: Symmetry-driven accumulation of local features for human characterization and re-identification. Comput. Vis. Image Underst. 117(2), 130–144 (2013)
5. Berg, T.L., Berg, A.C., Shih, J.: Automatic attribute discovery and characterization from noisy web data. In: European Conference on Computer Vision (2010)
6. Chang, C.C., Lin, C.J.: LIBSVM: a library for support vector machines. In: ACM Trans. Intell. Syst. Technol. 2(3), 27:1–27:27 (2011)
7. Chawla, N.V., Bowyer, K.W., Hall, L.O.: SMOTE: synthetic minority over-sampling technique. J. Artif. Intell. Res. 16, 321–357 (2002)
8. Cheng, D., Cristani, M., Stoppa, M., Bazzani, L.: Custom pictorial structures for re-identification. In: British Machine Vision Conference (2011)
9. Dantcheva, A., Velardo, C., Dángelo, A., Dugelay, J.L.: Bag of soft biometrics for person identification. Multimedia Tools Appl. 51(2), 739–777 (2011)
10. Ferrari, V., Zisserman, A.: Learning visual attributes. In: Neural Information Processing Systems (2007)
11. Fu, Y., Hospedales, T., Xiang, T., Gong, S.: Attribute learning for understanding unstructured social activity. In: European Conference on Computer Vision, Florence (2012)
12. Gray, D., Brennan, S., Tao, H.: Evaluating appearance models for recognition, reacquisition, and tracking. In: IEEE International Workshop on Performance Evaluation for Tracking and Surveillance, vol. 3 (2007)
13. Gray, D., Tao, H.: Viewpoint invariant pedestrian recognition with an ensemble of localized features. In: European Conference on Computer Vision, Marseille (2008)
14. He, H., Garcia, E.A.: Learning from imbalanced data. In: IEEE Transactions on Data and Knowledge Engineering, vol. 21 (2009)
15. Hirzer, M., Beleznai, C., Roth, P., Bischof, H.: Person re-identification by descriptive and discriminative classification. In: Scandinavian Conference on Image analysis (2011)
16. Hirzer, M., Roth, P.M., Bischof, H.: Person re-identification by efficient impostor-based metric learning. In: IEEE International Conference on Advanced Video and Signal-Based Surveillance (2012)
17. Hirzer, M., Roth, P.M., Martin, K., Bischof, H., Köstinger, M.: Relaxed pairwise learned metric for person re-identification. In: European Conference on Computer Vision, Florence (2012)
18. Jain, A.K., Dass, S.C., Nandakumar, K.: Soft biometric traits for personal recognition systems. In: International Conference on Biometric Authentication, Hong Kong (2004)
19. Keval, H.: CCTV Control room collaboration and communication: does it Work? In: Human Centred Technology Workshop (2006)
20. Kumar, N., Berg, A., Belhumeur, P.: Describable visual attributes for face verification and image search. IEEE Trans. Pattern Anal. Mach. Intell. 33(10), 1962–1977 (2011)
21. Lampert, C.H., Nickisch, H., Harmeling, S.: Learning to detect unseen object classes by between-class attribute transfer. In: IEEE Conference on Computer Vision and Pattern Recognition (2009)
22. Layne, R., Hospedales, T.M., Gong, S.: Person re-identification by attributes. In: British Machine Vision Conference (2012)
23. Layne, R., Hospedales, T.M., Gong, S.: Towards person identification and re-identification with attributes. In: European Conference on Computer Vision, First International Workshop on Re-identification, Florence (2012)

24. Liu, C., Gong, S., Loy, C.C., Lin, X.: Person re-identification: what features are important? In: European Conference on Computer Vision, First International Workshop on Re-identification, Florence (2012)
25. Liu, J., Kuipers, B.: Recognizing human actions by attributes. In: IEEE Conference on Computer Vision and Pattern Recognition pp. 3337–3344 (2011)
26. Liu, D., Nocedal, J.: On the limited memory method for large scale optimization. Math. Program. B 45(3), 503–528 (1989)
27. Loy, C.C., Xiang, T., Gong, S.: Time-Delayed Correlation Analysis for Multi-Camera Activity Understanding. Int. J. Comput. Vision 90(1), 106–129 (2010)
28. Mackay, D.J.C.: Information Theory, Inference, and Learning Algorithms, 4th edn. Cambridge University Press, Cambridge (2003)
29. Madden, C., Cheng, E.D., Piccardi, M.: Tracking people across disjoint camera views by an illumination-tolerant appearance representation. Mach. Vis. Appl. 18(3–4), 233–247 (2007)
30. Murphy, K.P.: Machine Learning: A Probabilistic Perspective. MIT Press, Cambridge, MA, (2012)
31. Nixon, M.S., Aguado, A.S.: Feature Extraction and Image Processing for Computer Vision, 3rd edn. Academic Press, Waltham (2012)
32. Nocedal, J., Wright, S.: Numerical Optimization, 2nd edn. Springer-Verlag, Newyork (2006)
33. Nortcliffe, T.: People Analysis CCTV Investigator Handbook. Home Office Centre of Applied Science and Technology, UK Home Office (2011)
34. Orabona, F., Jie, L.: Ultra-fast optimization algorithm for sparse multi kernel learning. In: International Conference on Machine Learning (2011)
35. Orabona, F.: DOGMA: a MATLAB toolbox for online learning (2009)
36. Platt, J.C.: Probabilities for SV machines. In: Advances in Large Margin Classifiers. MIT Press, Cambridge (1999)
37. Prosser, B., Zheng, W.S., Gong, S., Xiang, T.: Person re-identification by support vector ranking. In: British Machine Vision Conference (2010)
38. Satta, R., Fumera, G., Roli, F.: A general method for appearance-based people search based on textual queries. In: European Conference on Computer Vision, First International Workshop on Re-Identification (2012)
39. Schneiderman, R.: Trends in video surveillance give dsp an apps boost. IEEE Signal Process. Mag. 6(27), 6–12 (2010)
40. Schölkopf, B., Smola, A.J.: Learning with kernels: Support Vector Machines, Regularization, Optimization, and Beyond. MIT Press, Cambridge, MA (2002)
41. Siddiquie, B., Feris, R.S., Davis, L.S.: Image ranking and retrieval based on multi-attribute queries. In: IEEE Conference on Computer Vision and Pattern Recognition (2011)
42. Smyth, P.: Bounds on the mean classification error rate of multiple experts. Pattern Recogn. Lett. 17, 1253–1257 (1996)
43. Vaquero, D.A., Feris, R.S., Tran, D., Brown, L., Hampapur, A., Turk, M.: Attribute-based people search in surveillance environments. In: IEEE International Workshop on the Applications of Computer Vision, Snowbird, Utah (2009)
44. Walt, C.V.D., Barnard, E.: Data characteristics that determine classifier performance. In: Annual Symposium of the Pattern Recognition Association of South Africa (2006)
45. Williams, D.: Effective CCTV and the challenge of constructing legitimate suspicion using remote visual images. J. Invest. Psychol. Offender Profil. 4(2), 97–107 (2007)
46. Zheng, W.S., Gong, S., Xiang, T.: Associating groups of people. In: British Machine Vision Conference (2009)
47. Zheng, W.S., Gong, S., Xiang, T.: Person re-identification by probabilistic relative distance comparison. In: IEEE Conference on Computer Vision and Pattern Recognition (2011)
48. Zheng, W.S., Gong, S., Xiang, T.: Transfer re-identification : from person to set-based verification. In: IEEE Conference on Computer Vision and Pattern Recognition (2012)
49. Zheng, W.S., Gong, S., Xiang, T.: Quantifying and Transferring Contextual Information in Object Detection. IEEE Trans. Pattern Anal. Mach. Intell. 1(8), 762–777 (2011)

5 Attributes-Based Re-identification

50. Zheng, W.S., Gong, S., Xiang, T.: Re-identification by Relative Distance Comparison. IEEE Trans. Pattern Anal. Mach. Intell. 35(3), 653–668 (2013)
51. Zhu, X., Wu, X.: Class Noise vs. Attribute Noise: A Quantitative Study of Their Impacts. Artif. Intell. Rev. 22(1), 177–210 (2004)

The invention claimed is:

1. A method for finding a target within visual data, the method comprising the steps of:
   receiving target object information identifying one or more visual characteristics of the target;
   generating a set of target object semantic attributes to represent the target, each semantic attribute associated with a visual characteristic identified in the target object information;
   identifying a plurality of portions within visual data, each representing a candidate object being a visual object that is a potential visual match to the target;
   for each portion of visual data representing a candidate object, generating a set of low-level feature descriptors from the visual data;
   generating from the set of low-level feature descriptors a set of semantic attributes representing each candidate object, by identifying semantic attributes within a database associated with stored low-level feature descriptors that match the generated low-level feature descriptors;
   identifying one or more of the plurality of candidate objects having greatest similarity to the target; and
   providing a filtered output indicating the portions of the visual data which the one or more identified candidate objects represents, wherein the filtered output corresponds to less than all the visual data,
   wherein the step of identifying one or more of the plurality of candidate objects having greatest similarity to the target comprises:
   computing a distance metric, d, between each candidate object and the target object according to:

$$d(x_i,x_j)=w_{LLF}d_{LLF}(x_i,x_j)+w_A(A(x_i)-A(x_j))^TM(A(x_i)-A(x_j))$$

where i and j index target and candidate images respectively; $w_{LLF}$ and $w_A$ weight the contributions of low-level features and semantic attributes, respectively; for an image x then A(x) is a set of sematic attributes represented by an attribute profile vector; and M is a diagonal or full Mahalanobis matrix to encode weights for individual semantic attributes and semantic attribute correlations, respectively;
   wherein a gradient-based optimisation is used to determine weights $w_{LLF}$ and $w_A$, such that weight $w_{LLF}$ for each low level feature and weight $w_A$ for each semantic attribute are set by minimizing an objective function for a training probe set P and a gallery set G according to:

$$ER(w_{LLF}, w_A, M) = \frac{1}{P}\sum_{p\in P}\sum_{g\in G}\sigma_M(d_{pp}-d_{pg}) + \lambda|w-w_0|^2$$

where $\sigma_M$ is a sigmoid function which makes the objective function smooth, $d_{pp}$ is the distance of true matches, $d_{pg}$ are the distances of false matches, and $\lambda$ and $w_0$ are an optional regularizer strength and bias.

2. The method of claim 1, wherein the low-level features are any one or more selected from the group consisting of: luminance, colour, and texture histogram.

3. The method according to claim 1, wherein the received target object information includes a moving or still image of the target object.

4. The method of claim 3, wherein the received target object information is a moving or still image of the target object, and wherein the step of generating a set of semantic attributes to represent the target further comprises:
   generating from the moving or still image of the target object a set of target low-level feature descriptors; and
   identifying the set of semantic attributes within the database associated with stored low-level feature descriptors that match the target low-level feature descriptors to generate the set of semantic attributes representing the target.

5. The method according to claim 1, wherein generating semantic attributes from the generated low-level feature descriptors comprises:
   identifying semantic attributes within a database associated with stored low-level feature descriptors that match the generated low-level feature descriptors.

6. The method of claim 5, wherein the identified semantic attributes within the database are generated from still and/or moving images of objects previously assigned with semantic attributes.

7. The method of claim 5, wherein the database is built by:
   searching for moving or still images associated with the one or more semantic attributes;
   extracting low-level feature descriptors from the moving or still images; and
   storing in the database the one or more semantic attributes associated with the extracted low-level feature descriptors.

8. The method according to claim 1, wherein the received target object information includes one or more textual labels identifying the one or more visual characteristics of the target.

9. The method according to claim 1, wherein the semantic attributes are any one or more selected from the group consisting of: shirt colour, trouser type, bare legs, coat, male, female, dark hair, hair colour, bald, carrying bag, bad type, skirt, hat, child, adult, and facial hair.

10. The method according to claim 1, wherein the step of identifying one or more of the candidate objects having greatest similarity to the target further comprises the step of:
    finding the most similar candidate object, j, to the target according to:

$$j=\text{argmin } d(x_i,x_j)$$

where $d(x_i,x_j)$ is a distance metric between the appearance of the visual data containing the candidate object, j, and visual data containing the target object, i.

11. The method according to claim 1, wherein the set of target object semantic attributes are weighted according to a machine learning model.

12. The method according to claim 1, further comprising the step of restricting the visual data to image areas of the visual data containing candidate objects.

13. The method according to claim 1, wherein the output provides a summary of the visual data.

14. The method according to claim 1, wherein the target object information is a user selection of a target within a moving image.

15. A method of re-identifying one or more targets within visual data, the method comprising the steps of:
    receiving target object information identifying one or more visual characteristics of the target;
    generating a set of semantic attributes to represent the target, each semantic attribute associated with a visual characteristic identified in the target object information;

identifying a plurality of portions within visual data, each representing a candidate object being a visual object that is a potential visual match to the target;

for each portion of visual data representing a candidate object, generating a set of low-level feature descriptors from the visual data;

generating from the set of low-level feature descriptors a set of semantic attributes representing each candidate object, by identifying semantic attributes within a database associated with stored low-level feature descriptors that match the generated low-level feature descriptors;

identifying one or more of the plurality of candidate objects having greatest similarity to the target; and outputting an indication of filtered portions of the visual data containing the identified one or more of the plurality of candidate objects, wherein the filtered portions of the visual data are less than all the visual data, wherein the step of identifying one or more of the plurality of candidate objects having greatest similarity to the target comprises:

computing a distance metric, d, between each candidate object and the target object according to:

$$d(x_i,x_j)=w_{LLF}d_{LLF}(x_i,x_j)+w_A(A(x_i)-A(x_j))^T M(A(x_i)-A(x_j))$$

where i and j index target and candidate images respectively; $w_{LLF}$ and $w_A$ weight the contributions of low-level features and semantic attributes, respectively; for an image x then $A(x)$ is a set of sematic attributes represented by an attribute profile vector; and M is a diagonal or full Mahalanobis matrix to encode weights for individual semantic attributes and semantic attribute correlations, respectively;

wherein a gradient-based optimisation is used to determine weights $w_{LLF}$ and $w_A$, such that weight $w_{LLF}$ for each low level feature and weight $w_A$ for each semantic attribute are set by minimizing an objective function for a training probe set P and a gallery set G according to:

$$ER(w_{LLF}, w_A, M) = \frac{1}{P}\sum_{p \in P}\sum_{g \in G} \sigma_M(d_{pp} - d_{pg}) + \lambda|w - w_0|^2$$

where $\sigma_M$ is a sigmoid function which makes the objective function smooth, $d_{pp}$ is the distance of true matches, $d_{pg}$ are the distances of false matches, and $\lambda$ and $w_0$ are an optional regularizer strength and bias.

16. The method of claim 15 wherein the step of outputting an indication of the portions of the visual data containing the identified one or more of the plurality of candidate objects comprises providing a summary of the visual data by outputting portions of the visual data containing the identified one or more candidate objects.

17. A system for identifying targets within visual data, comprising:

an output device; and a processor configured to:

receive target object information identifying one or more visual characteristics of the target;

generate a set of semantic attributes to represent the target, each semantic attribute associated with a visual characteristic identified in the target object information;

identify a plurality of portions within visual data, each representing a candidate object being a visual object that is a potential visual match to the target;

for each portion of visual data representing a candidate object, generate a set of low-level feature descriptors from the visual data for each candidate object;

generate from the set of low-level feature descriptors a set of semantic attributes representing each candidate object, by identifying semantic attributes within a database associated with stored low-level feature descriptors that match the generated low-level feature descriptors;

identify one or more of the plurality of candidate objects having greatest similarity to the target; and send to the output device a filtered output indicating the portions of the visual data which the one or more identified candidate objects represents, wherein the filtered output corresponds to less than all the visual data, wherein to identify one or more of the plurality of candidate objects having greatest similarity to the target, the processor is further configured to:

compute a distance metric, d, between each candidate object and the target object according to:

$$d(x_i,x_j)=w_{LLF}d_{LLF}(x_i,x_j)+w_A(A(x_i)-A(x_j))^T M(A(x_i)-A(x_j))$$

where i and j index target and candidate images respectively; $w_{LLF}$ and $w_A$ weight the contributions of low-level features and semantic attributes, respectively; for an image x then $A(x)$ is a set of semantic attributes represented by an attribute profile vector; and M is a diagonal or full Mahalanobis matrix to encode weights for individual semantic attributes and semantic attribute correlations, respectively;

wherein a gradient-based optimisation is used to determine weights $w_{LLF}$ and $w_A$, such that weight $w_{LLF}$ for each low level feature and weight $w_A$ for each semantic attribute are set by minimizing an objective function for a training probe set P and a gallery set G according to:

$$ER(w_{LLF}, w_A, M) = \frac{1}{P}\sum_{p \in P}\sum_{g \in G} \sigma_M(d_{pp} - d_{pg}) + \lambda|w - w_0|^2$$

where $\sigma_M$ is a sigmoid function which makes the objective function smooth, $d_{pp}$ is the distance of true matches, $d_{pg}$ are the distances of false matches, and $\lambda$ and $w_0$ are an optional regularizer strength and bias.

18. The system of claim 17 further comprising one or more video feeds configured to provide the visual data to the processor.

* * * * *